US012489887B2

(12) United States Patent
Keating et al.

(10) Patent No.: US 12,489,887 B2
(45) Date of Patent: Dec. 2, 2025

(54) IMAGE DATA ENCODING AND DECODING

(71) Applicant: Sony Group Corporation, Tokyo (JP)

(72) Inventors: Stephen Mark Keating, Basingstoke (GB); Karl James Sharman, Basingstoke (GB); Magali Kimlee Miri Philippe, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 87 days.

(21) Appl. No.: 18/184,531

(22) Filed: Mar. 15, 2023

(65) Prior Publication Data

US 2023/0217020 A1 Jul. 6, 2023

Related U.S. Application Data

(63) Continuation of application No. 16/756,030, filed as application No. PCT/GB2018/053076 on Oct. 24, 2018, now abandoned.

(30) Foreign Application Priority Data

Oct. 27, 2017 (GB) ...................................... 1717683

(51) Int. Cl.
*H04N 19/00* (2014.01)
*H04N 19/105* (2014.01)
(Continued)

(52) U.S. Cl.
CPC ........... *H04N 19/11* (2014.11); *H04N 19/105* (2014.11); *H04N 19/132* (2014.11);
(Continued)

(58) Field of Classification Search
CPC .................................................... H04N 19/00
See application file for complete search history.

(56) References Cited

U.S. PATENT DOCUMENTS

2013/0121401 A1 5/2013 Zheludkov
2013/0259128 A1 10/2013 Song et al.
(Continued)

FOREIGN PATENT DOCUMENTS

CN 103238333 A 8/2013
KR 10-1713250 B1 2/2017
(Continued)

OTHER PUBLICATIONS

International Search report issued Jan. 28, 2019 in PCT/GB2018/053076 filed Oct. 24, 2018.

*Primary Examiner* — Maryam A Nasri
(74) *Attorney, Agent, or Firm* — Oblon, McClelland, Maier & Neustadt, L.L.P.

(57) ABSTRACT

An image encoding apparatus comprises a controller configured to select, from a set of prediction directions, a set of candidate prediction directions as a subset of the set of prediction directions, for a current image region of a current image in dependence upon one or more properties of a group of reference samples of the current image applicable to the current image region; and an intra-image predictor configured to predict samples of the current image region with respect to one or more of the group of reference samples of the same image according to a prediction direction between the current sample and a reference position amongst the reference samples; in which the intra-image predictor is configured to select the prediction direction for the current image region from the set of candidate prediction directions.

20 Claims, 18 Drawing Sheets

(51) Int. Cl.
*H04N 19/11* (2014.01)
*H04N 19/132* (2014.01)
*H04N 19/159* (2014.01)
*H04N 19/17* (2014.01)
*H04N 19/176* (2014.01)

(52) U.S. Cl.
CPC ........... *H04N 19/159* (2014.11); *H04N 19/17* (2014.11); *H04N 19/176* (2014.11)

(56) References Cited

U.S. PATENT DOCUMENTS

| | | | |
|---|---|---|---|
| 2014/0286403 A1* | 9/2014 | Nishitani | H04N 19/124 375/240.03 |
| 2016/0073107 A1 | 3/2016 | Moon et al. | |
| 2018/0184082 A1 | 6/2018 | Yoo et al. | |
| 2018/0255304 A1 | 9/2018 | Jeon et al. | |

FOREIGN PATENT DOCUMENTS

| | | |
|---|---|---|
| WO | WO 2012/026794 A2 | 3/2012 |
| WO | WO 2016/159631 A1 | 10/2016 |
| WO | WO 2016/204478 A1 | 12/2016 |
| WO | WO 2018/060329 A1 | 4/2018 |

\* cited by examiner

IMAGE DATA ENCODING AND DECODING

CROSS-REFERENCE TO RELATED APPLICATIONS

This application is a continuation of U.S. application Ser. No. 16/756,030, filed Apr. 14, 2020, which is a National Stage Application of PCT/GB2018/053076 filed on Oct. 24, 2018, which is based upon and claims the benefit of priority to United Kingdom Patent Application No. 1717683.5, filed on Oct. 27, 2017, the entire contents of which are incorporated herein by reference.

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Current video codecs (coder-decoders) such as those used in H.264/MPEG-4 Advanced Video Coding (AVC) achieve data compression primarily by only encoding the differences between successive video frames. These codecs use a regular array of so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
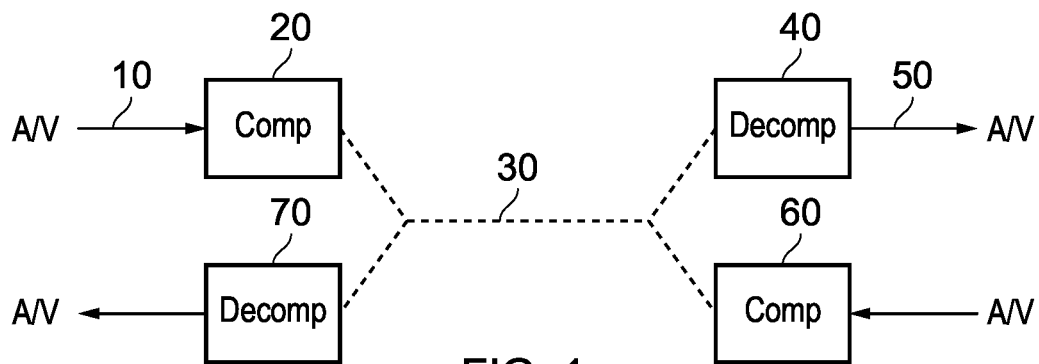
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
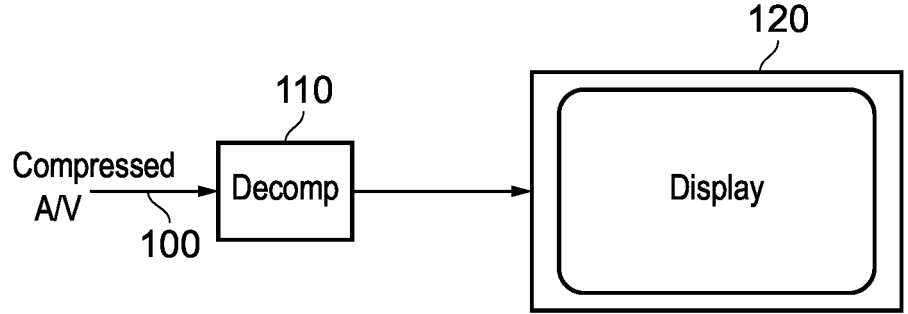
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
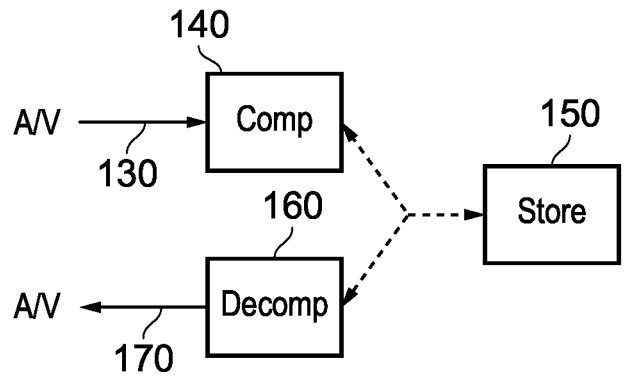
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
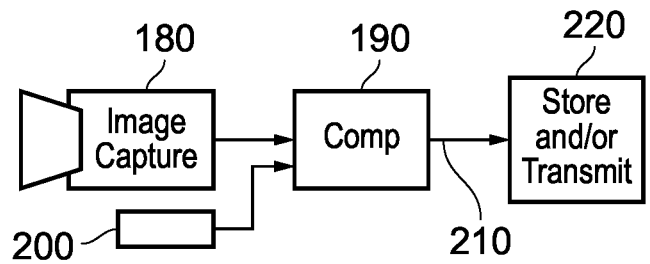
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190.

The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
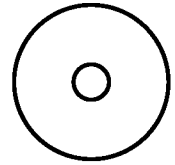
FIGS. 5 and 6 schematically illustrate storage media.
Figure 6:

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
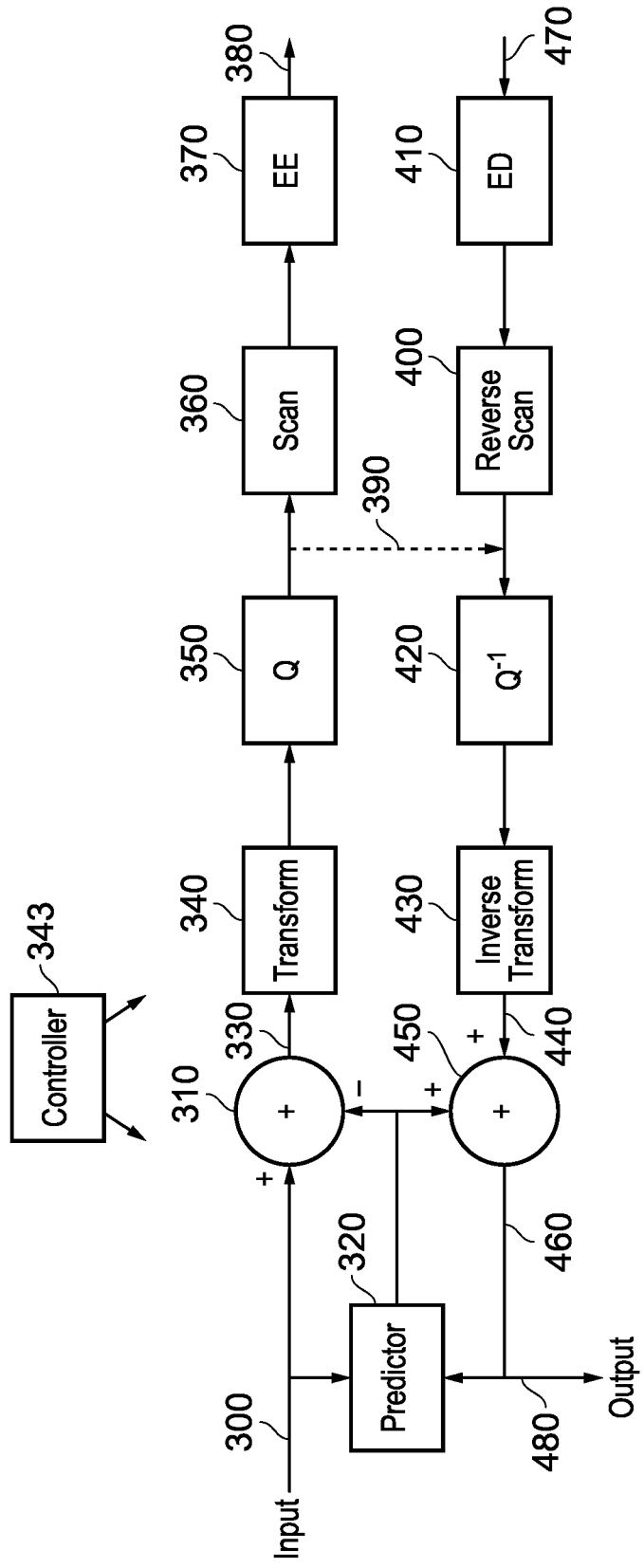
FIG. 7 provides a schematic overview of a video data compression and decompression apparatus.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
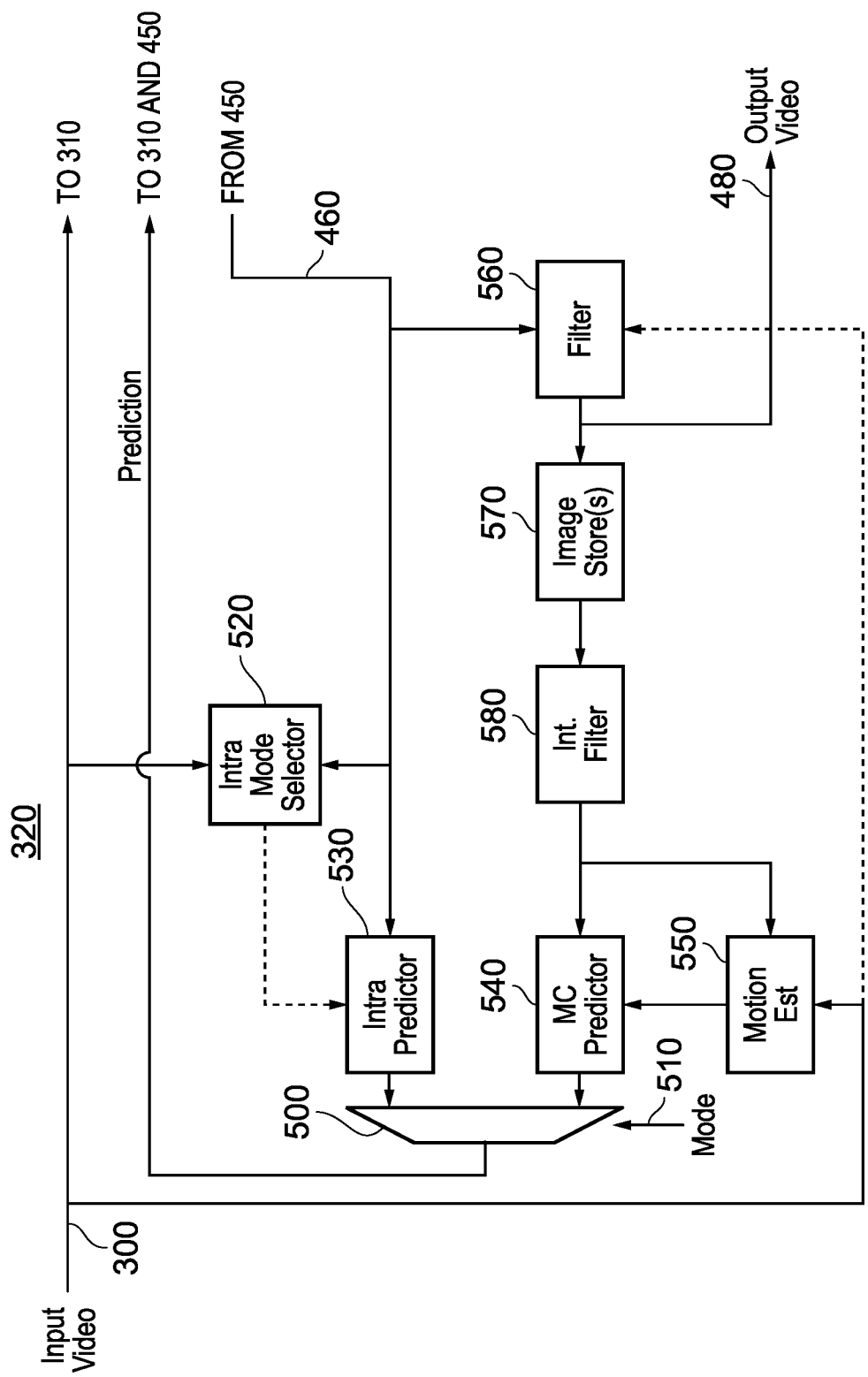
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in Bross et al: "High Efficiency Video Coding (HEVC) text specification draft 6", JCTVC-H1003_d0 (November 2011), the contents of which are incorporated herein by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
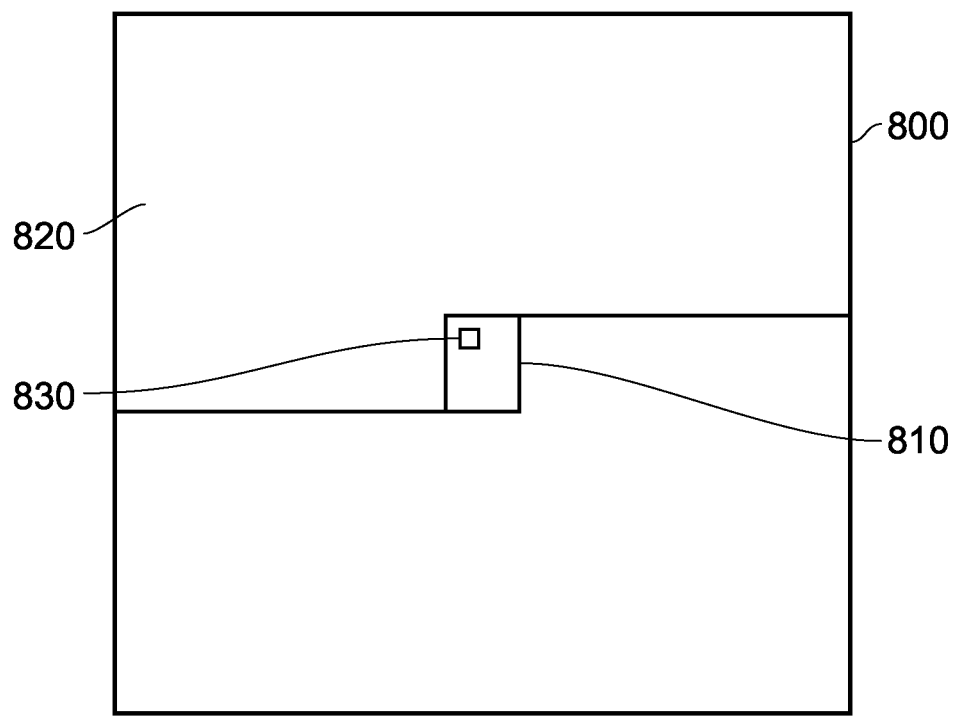
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of the same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
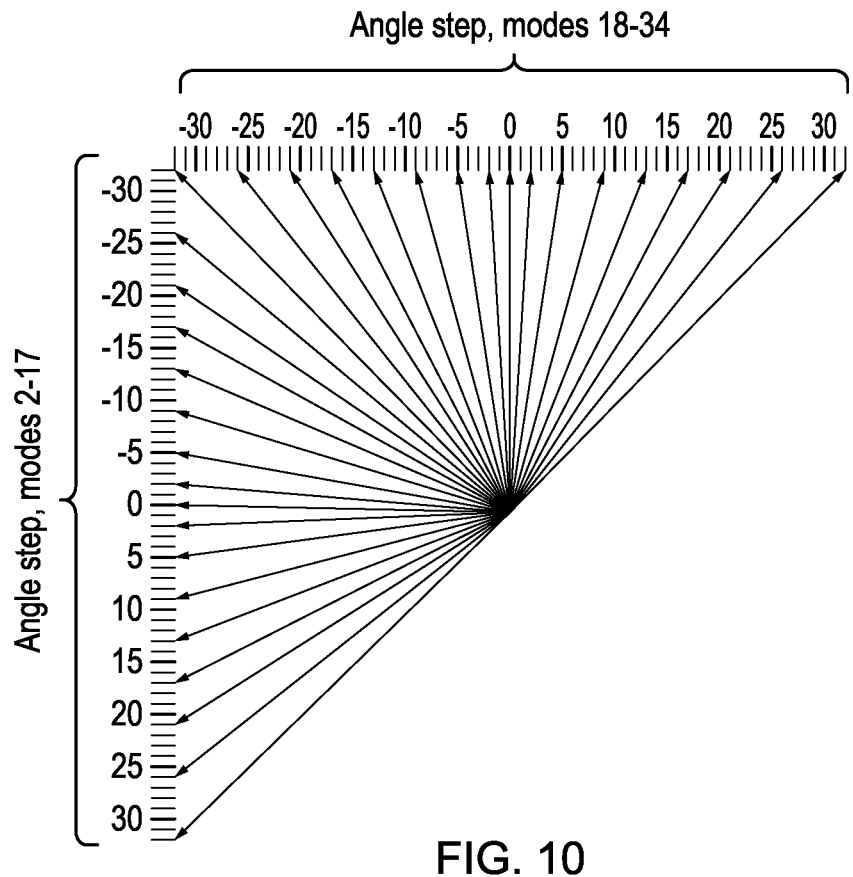
FIG. 10 schematically illustrates a set of possible intra-prediction directions.
Figure 11:
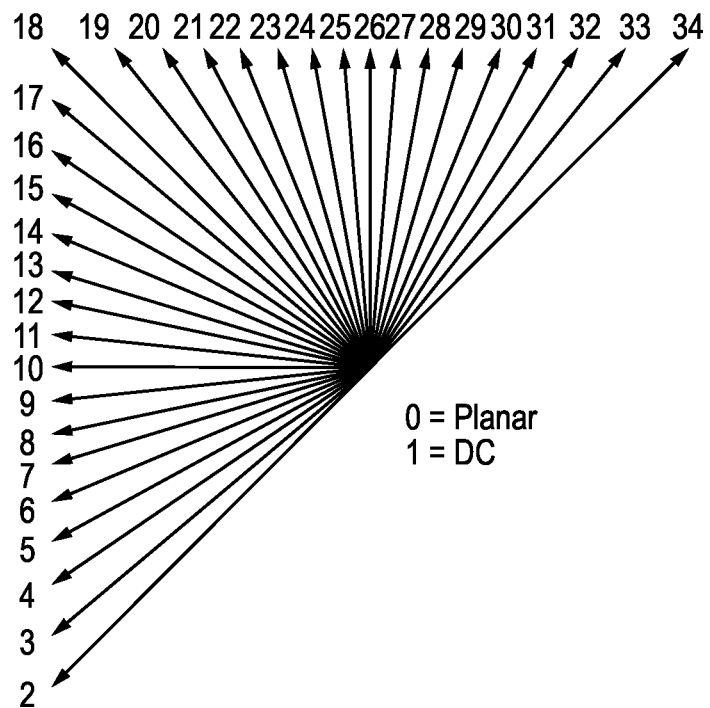
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image.

Figure 13:
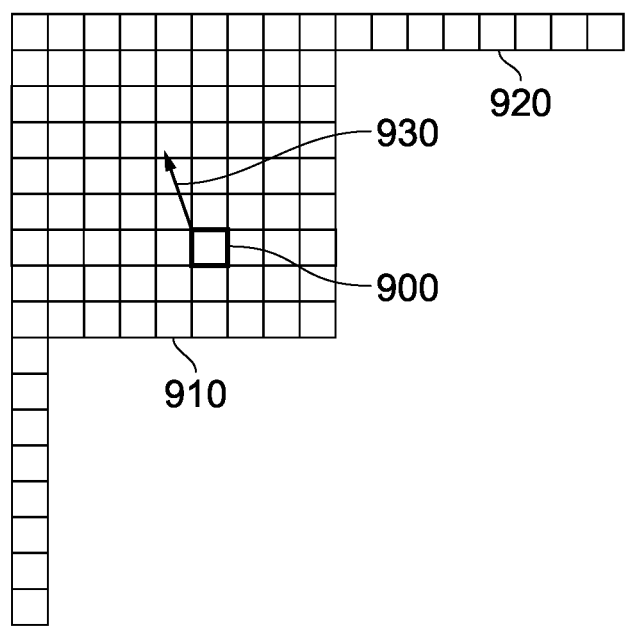
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figures 14, 15:
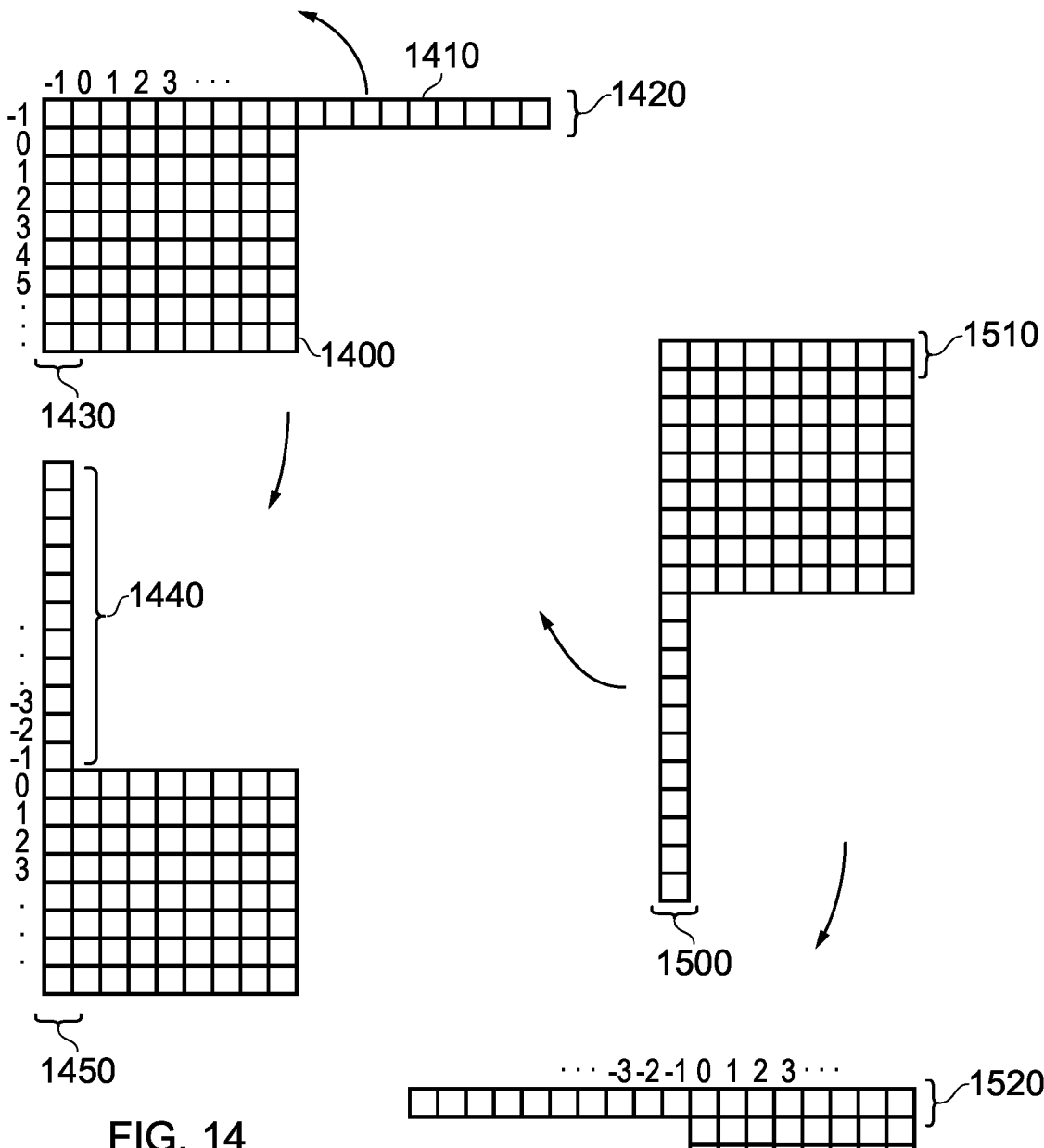
FIGS. 14 and 15 schematically illustrate a reference sample projection process.

FIGS. 14 and 15 schematically illustrate a previously proposed reference sample projection process.

In FIGS. 14 and 15, a block or region 1400 of samples to be predicted is surrounded by linear arrays of reference samples from which the intra prediction of the predicted samples takes place. The reference samples 1410 are shown as shaded blocks in FIGS. 14 and 15, and the samples to be predicted are shown as unshaded blocks. Note that an 8×8 block or region of samples to be predicted is used in this example, but the techniques are applicable to variable block sizes and indeed block shapes.

As mentioned, the reference samples comprise at least two linear arrays in respective orientations with respect to the current image region of samples to be predicted. For example, the linear arrays may be an array or row 1420 of samples above the block of samples to be predicted and an array or column 1430 of samples to the left of the block of samples to be predicted.

Figure 12:
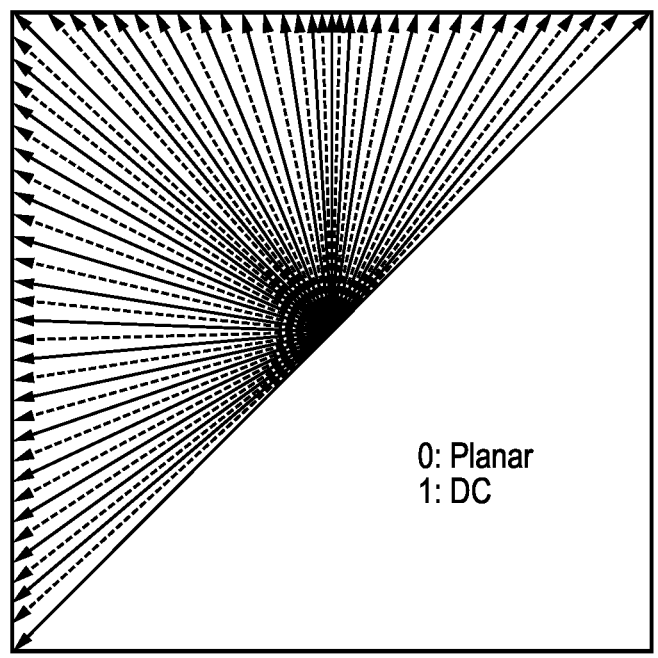
FIG. 12 schematically illustrates another set of prediction modes.

As discussed above with reference to FIG. 13, the reference sample arrays can extend beyond the extent of the block to be predicted, in order to provide for prediction modes or directions within the range indicated in FIGS. 10-12. Where necessary, if previously decoded samples are not available for use as reference samples at particular reference sample positions, other reference samples can be re-used at those missing positions. Reference sample filtering processes can be used on the reference samples.

A sample projection process is used to project at least some of the reference samples to different respective positions with respect to the current image region, in the manner shown in FIGS. 14 and 15. In other words, in embodiments, the projection process and circuitry operates to represent at least some of the reference samples at different spatial positions relative to the current image region, for example as shown in FIGS. 14 and 15. Thus at least some reference samples may be moved (for the purposes at least of defining an array of reference samples from which samples are predicted) with respect to their relative positions to the current image region. In particular, FIG. 14 relates to a projection process performed for modes which are generally to the left of the diagonal mode (18 in FIG. 11) mainly modes 2 . . . 17, and FIG. 15 schematically illustrates a reference sample projection carried for modes 19 . . . 34, namely those generally above the block to be predicted (to the right of the diagonal mode 18). The diagonal mode 18 can be assigned to either of these two groups as an arbitrary selection, such as to the group of modes to the right of the diagonal. So, in FIG. 14, when the current prediction mode is between modes 2 and 17 (or their equivalent in a system such as that of FIG. 12 having a different number of possible prediction modes), the sample array 1420 above the current block is projected to form additional reference samples 1440 in the left hand column. Prediction then takes place with respect to the linear projected array 1450 formed of the original left hand column 1430 and the projected samples 1440. In FIG. 15, for modes between 18 and 34 of FIG. 11 (or their equivalent in other sets of prediction modes such as those shown in FIG. 12), the reference samples 1500 in the left hand column are projected so as to extend to the left of the reference samples 1510 above the current block. This forms a projected array 1520.

One reason why projection of this nature is carried out is to reduce the complexity of the intra prediction process, in that all of the samples to be predicted are then referencing a single linear array of reference samples, rather than referencing two orthogonal linear arrays.

Figure 16:
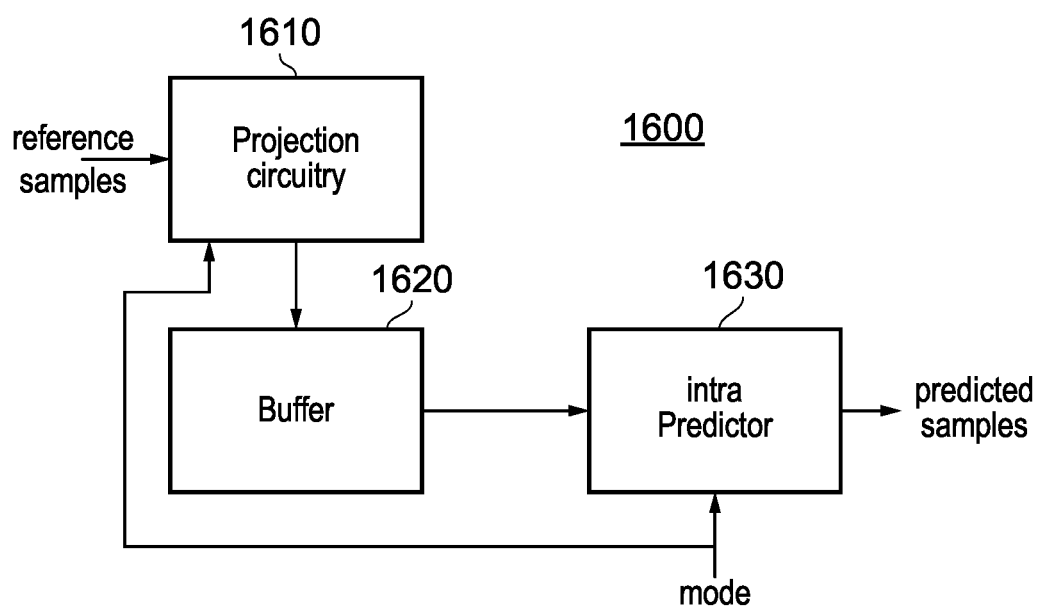
FIG. 16 schematically illustrates a predictor.

FIG. 16 schematically illustrates a previously proposed prediction circuitry 600 arranged to carry out the projection process of FIGS. 14 and 15, specifically by providing projection circuitry 1610 configured to carry out a projection process on the reference samples currently selected for a block of region to be predicted. The projected reference samples are stored in a buffer 1620 to be accessed by an intra predictor 1630 to generate predicted samples from the projected reference samples. The projection process is carried out according to the prediction mode associated with the current block to be predicted, using the techniques discussed in connection with FIGS. 14 and 15.

In embodiments, the same projection process is carried out in the decoder and in the encoder, so that the predicted samples are the same in each instance. Possible variations in operation between the use of prediction modes which will be referred to as "straight modes" and prediction modes which will be referred to as "curved modes" will now be discussed.

Figure 17:
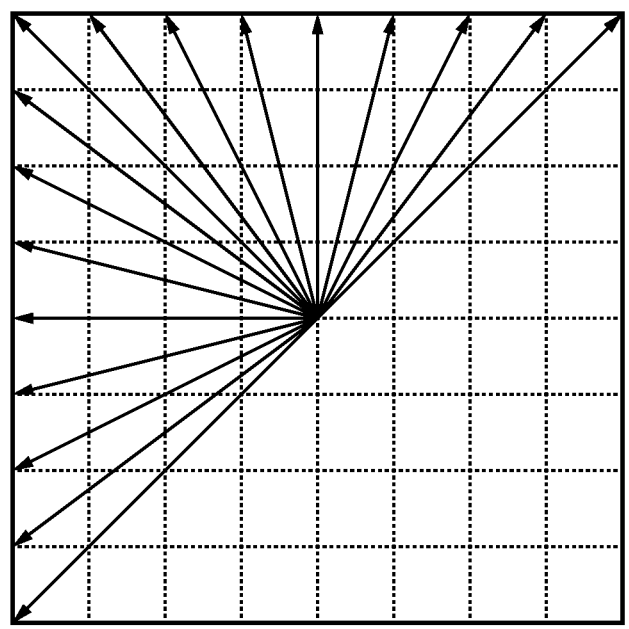
FIGS. 17 and 18 schematically illustrate examples of prediction directions.

The type of prediction modes shown schematically in, for example, FIGS. 10-12 are so-called straight modes, in that a particular direction of prediction is associated with each mode, and that direction has an associated angle (between a current sample to be predicted and a reference position amongst the reference samples from which the current sample is to be predicted) which is independent of the location, within the current region or block to be predicted, of the current sample to be predicted. Such an arrangement is shown schematically in FIG. 17 which represents various straight prediction modes. In the case of FIG. 17, a reduced version of the full set of straight prediction modes illustrated in FIGS. 10-12 is shown, simply for clarity of the diagram.

Figure 18:
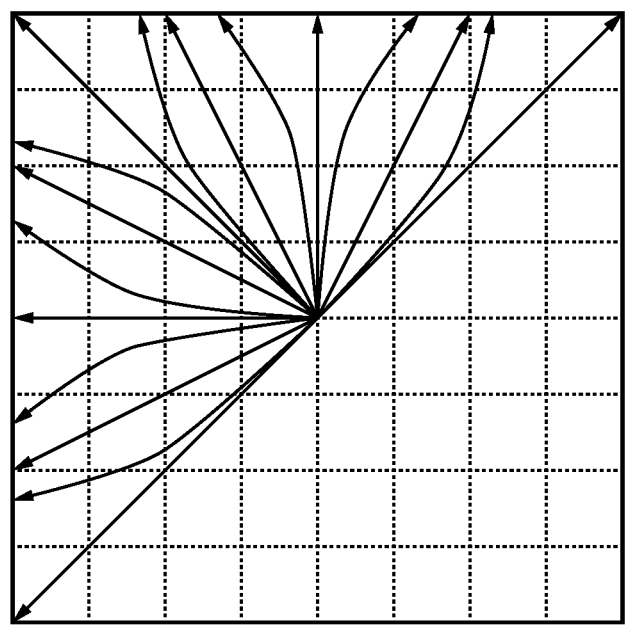

FIG. 18 schematically illustrates another example of a set of prediction modes. Again, purely for clarity of the diagram, a reduced number of prediction modes is shown than the number available in FIGS. 10-12, but the techniques to be described are applicable to sets of 35, 67 or other numbers of predictions modes. It can be seen in FIG. 18 that some of the directions associated with the prediction modes are not represented as straight lines. These so-called curved prediction modes define a prediction direction having an angle between the current sample to be predicted and a reference position among the reference samples which varies within a location, within the current region, of the current sample to be predicted. In embodiments, a curved mode may provide an improved prediction for some image regions. In embodiments, curved modes may provide an improved prediction for some image types, such as an equirectangular projected (ERP) images that can be used to represent omni-directional imagery, and in further embodiments, the extend of curvature of individual modes may vary for different positions across the image. Various examples of such arrangements will be described in more detail below with reference to FIGS. 38 to 39b.

FIG. 18 in fact represents an example hybrid set of prediction modes including some straight prediction modes (such as the diagonals and horizontal and vertical modes), and some curved prediction modes. The sense or polarity of the curvature can be in either direction, so that as drawn in FIG. 18, some of the curved modes curve in a clockwise sense (as drawn) and some curve in an anti-clockwise sense (as drawn). They may be considered portions of a parabola, i.e. parabolic in nature with either convex or concave inflexion, although other curve forms may be used. It will be appreciated that the set of modes shown schematically in FIG. 18 is not only representative of a smaller number of prediction modes than may be used in an example system, but is also purely for explanation and by way of example.

Therefore FIG. 18 provides an example of a set of prediction modes comprising at least one straight prediction mode defining a prediction direction having an angle between the current sample and the reference position which is independent of the location, within the current region, of the current sample to be predicted. For example, the set of candidate prediction directions may include at least a horizontal prediction direction and a vertical prediction direction.

Figure 19:
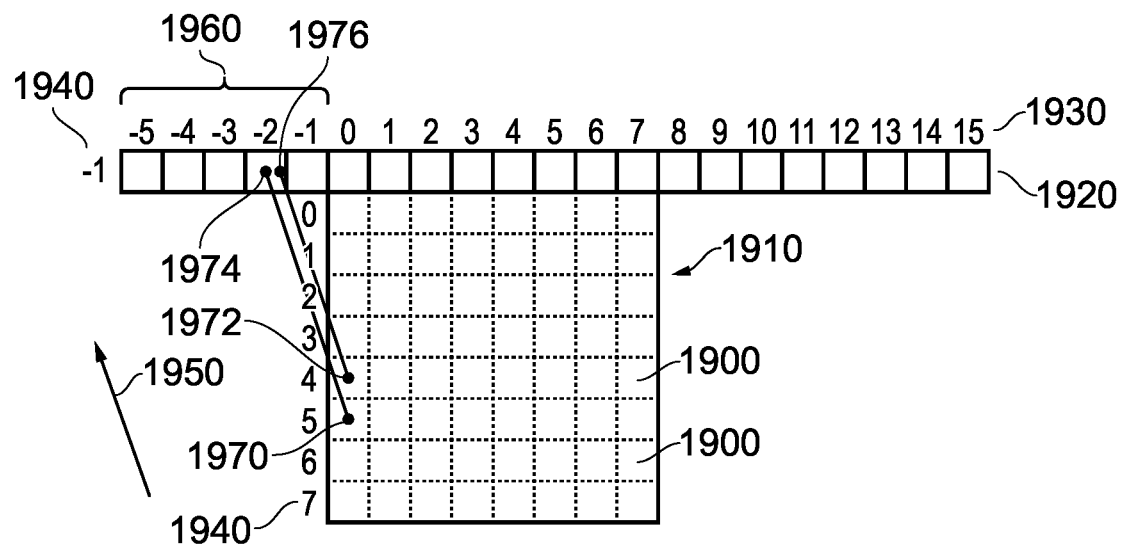
FIGS. 19 and 20 schematically illustrate the use of projected reference samples.
Figure 20:
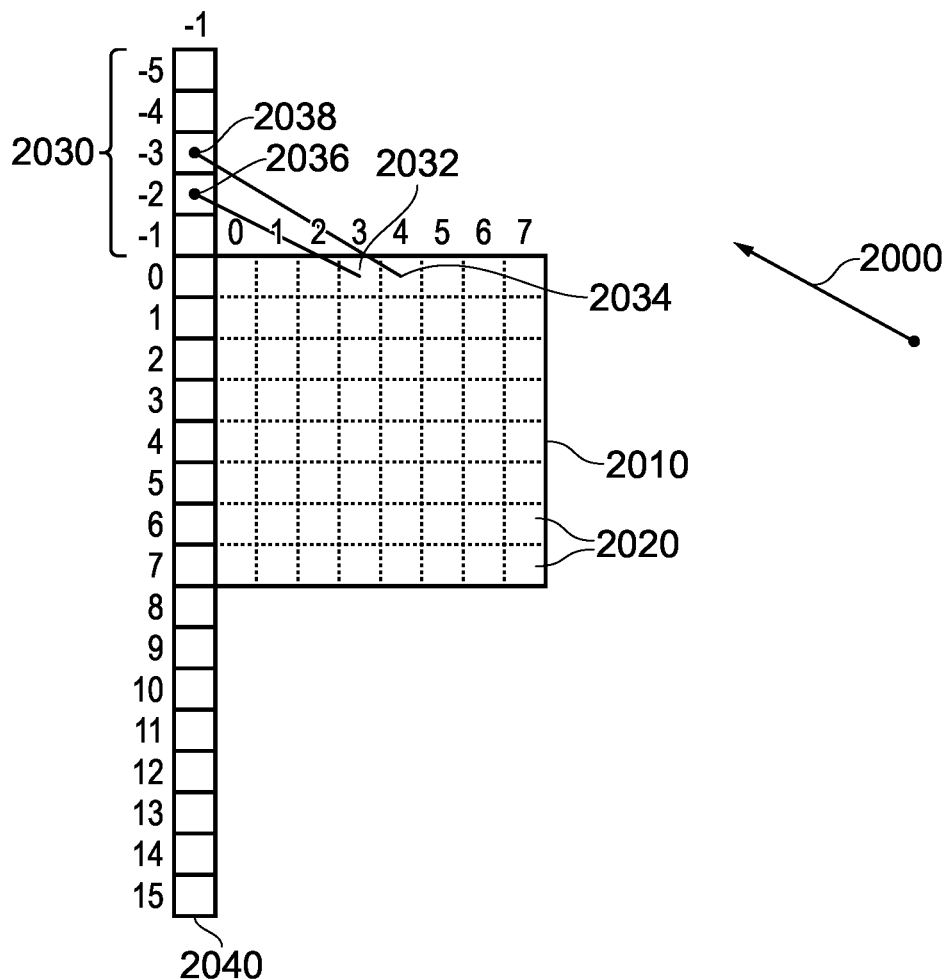

As further background to the explanation of straight and curved prediction modes, FIGS. 19 and 20 schematically illustrate an example technique by which samples 1900 of a current region 1910 or block to be predicted, are predicted from reference samples 1920. In this example, the reference samples have been projected into a linear array using the techniques described with reference to FIGS. 14-16 above.

A system of (x, y) coordinates is used for convenience, to allow individual reference or predicted sample positions to be identified. In the example of FIG. 19, x coordinates are shown by a row 1930 of numbers, and y coordinates are shown by a column 1940 of numbers. So, each reference or predicted sample position has an associated (x, y) designation using the coordinate system.

In the example of FIG. 19, a generally vertical mode (that is to say, a mode which is more vertical than horizontal) 1950, such as mode 23 in the designation of FIG. 11, noting that a different mode number could be used if the set of modes shown in FIG. 12 were employed, has been selected for prediction of samples 1900 of the block or region 1910. As discussed above with reference to FIGS. 14-16, such a generally vertical prediction mode is handled by the circuitry of FIG. 16 by projecting the left column of reference samples into an extension 1960 of the reference samples above the block or region 1910.

Each of the samples to be predicted 1900 is predicted as follows. For each sample to be predicted, there is an associated (x, y) location such as a location (0, 5) for a sample 1970 or a location (0, 4) for a sample 1972. These two samples are used purely by way of example and the same technique applies to each of the samples 1900 to be predicted.

The sample positions of the samples 1970, 1972 to be predicted are mapped according to the direction 1950 associated with the current prediction mode to respective locations or reference positions 1974, 1976 among the reference samples. This mapping may be carried out using an expression such as that shown below, noting that this is a linear expression with respect to the coordinate system (x, y):

For horizontal modes 2-17 in the notation of FIG. 11:

$$\text{predicted value}(x,y) = \{1-f(p)\} \times \text{ref}[y+i(p)] + f(p) \times \text{ref}[y+i(p)+1] \text{ with } p = A \times (x+1)$$

For vertical modes 18-34 in the notation of FIG. 11:

$$\text{predicted value}(x,y) = \{1-f(p)\} \times \text{ref}[x+i(p)] + f(p) \times \text{ref}[x+i(p)+1] \text{ with } p = A \times (y+1)$$

and where $i(p) = \text{floor}(p)$, is the value p rounded down (towards negative infinity) to the nearest integer, $f(p) = p - i(p)$ represents the fractional part of the value p.

A is an angle parameter indicating the angle of the current mode. To illustrate, for example, for a horizontal or vertical line, A would be 0; for a 45° diagonal line, A would be ±1.

Those skilled in the art would appreciate that integer approximations can be used to simplify the linear equations, for example, representing the angle parameter A as a fractional fixed-precision number. In HEVC, the angles have an accuracy of 5 fractional bits.

In example arrangements, the reference position 1974, 1976 is detected to an accuracy or resolution of less than one sample, which is to say with reference to the reference sample locations (−5, −1) . . . (15, −1), a fractional value is used for the x coordinate of the reference position within the projected set of reference samples 1920. For example, the reference position could be detected to a resolution of 1/32 of a sample separation, so that the x coordinate of the reference positions 1974, 1976 is identified to that resolution. The y coordinate of the reference position is −1 in each case, but this is in fact irrelevant to the calculations that then take place, which relate to interpolation along the x axis of the reference samples 1920.

The prediction of the predicted values 1970, 1972 is an interpolation of the value applicable to the detected x coordinate of the reference sample position 1974, 1976, for example as described above in the formulae shown earlier.

A similar arrangement is shown schematically in FIG. 20, except that a generally horizontal prediction mode, which is to say a prediction mode which is more horizontal than vertical, such as (for example) mode 14 of the set shown in FIG. 11 (or a corresponding number for a similar mode in the set shown in FIG. 12) having a prediction direction 2000 is used. The selection of the particular prediction mode applies to the whole of the block or region 2010 of samples 2020 to be predicted and the particular example here is chosen purely for the purposes of the present explanation.

In the case of a generally horizontal mode, as discussed above, the projection circuitry shown in FIG. 16 projects those reference samples from above the block or region 2010 to form an extension 2030 of reference samples to the left of the region. Once again, the derivation of two example samples to be predicted, samples 2032, 2034, is shown, such that the sample position 2032, 2034 are mapped using the direction 2000 into reference positions 2036, 2038 amongst the set of reference samples 2040. Once again, a similar (x, y) coordinate system is used and the reference positions 2036, 2038 are expressed to a ⅟₃₂ sample resolution in the y-direction. The x coordinate of the reference sample positions is −1 but this is irrelevant to the process which follows. The sample values of the samples to be predicted are obtained in the manner described above.

Using the background discussed with FIGS. 19 and 20, operations with respect to straight and curved prediction modes will now be discussed with reference to FIGS. 21 and 22. In these arrangements, the intra predictor 530 provides an example of a detector configured to detect the reference position as an array position, with respect to an array of the reference samples, pointed to by the prediction direction applicable to the current sample to be predicted; and a filter configured to generate the predicted sample by interpolation of the array of reference samples at the detected array position. The detector may be configured to detect the array position to an accuracy of less than one sample such as ⅟₃₂ sample.

The intra mode selector 520 the selector may be configured to perform at least a partial encoding to select the prediction mode.

Figure 21:
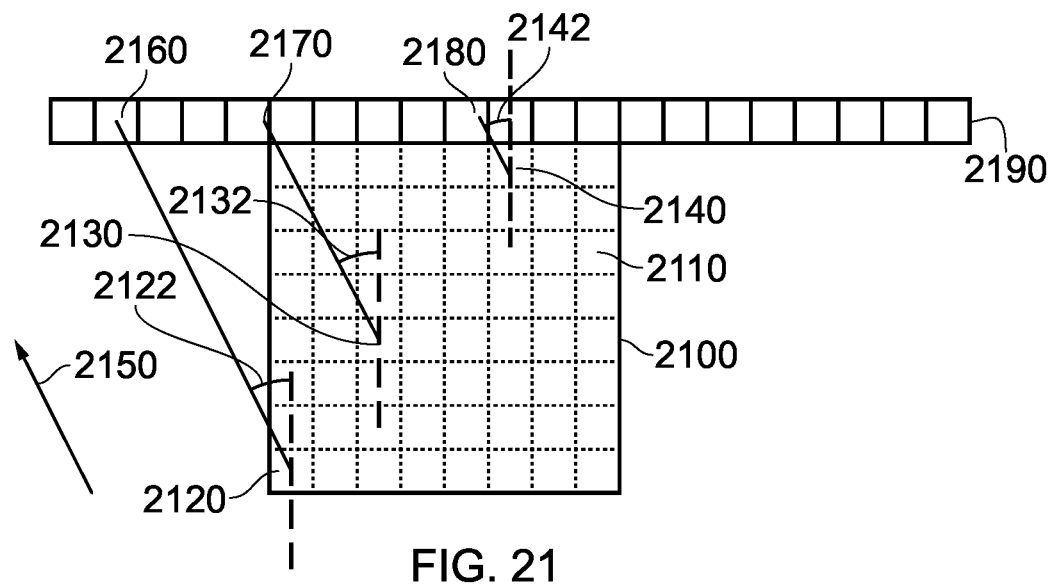
FIGS. 21 and 22 schematically illustrate straight and curved prediction modes respectively.

FIG. 21 shows an arrangement similar to that used in FIG. 19, relating to operation with respect to a straight prediction mode. Here, amongst a block 2100 of samples 2110 to be predicted, three example sample positions 2120, 2130, 2140 are considered, but the same principles apply to each sample position of each sample 2110 block or region 2100.

Taking the direction 2150 of the currently selected prediction mode into account, the positions of the samples 2120, 2130, 2140 to be predicted are mapped using the techniques described above to reference positions 2160, 2170, 2180 amongst the reference samples 2190 associated with the current block or region 2100. As discussed before, these reference positions 2160, 2170, 2180 can be expressed to a sub-sample resolution such as ⅟₃₂ samples in the x direction with respect to the reference samples 2190.

In each case, an angle 2122, 2132, 2142 which defines the direction or angle between the reference position 2160 . . . 2180 and the position 2120 . . . 2140 of the sample to be predicted, is the same. In other words it is independent of the location within the block or region 2100 of the sample to be predicted. This feature, that the angles 2122 . . . 2142 are all the same for each sample to be predicted within the block 2100, stems from the linear expression described above used to describe the reference position within the reference samples 2190.

Figure 22:
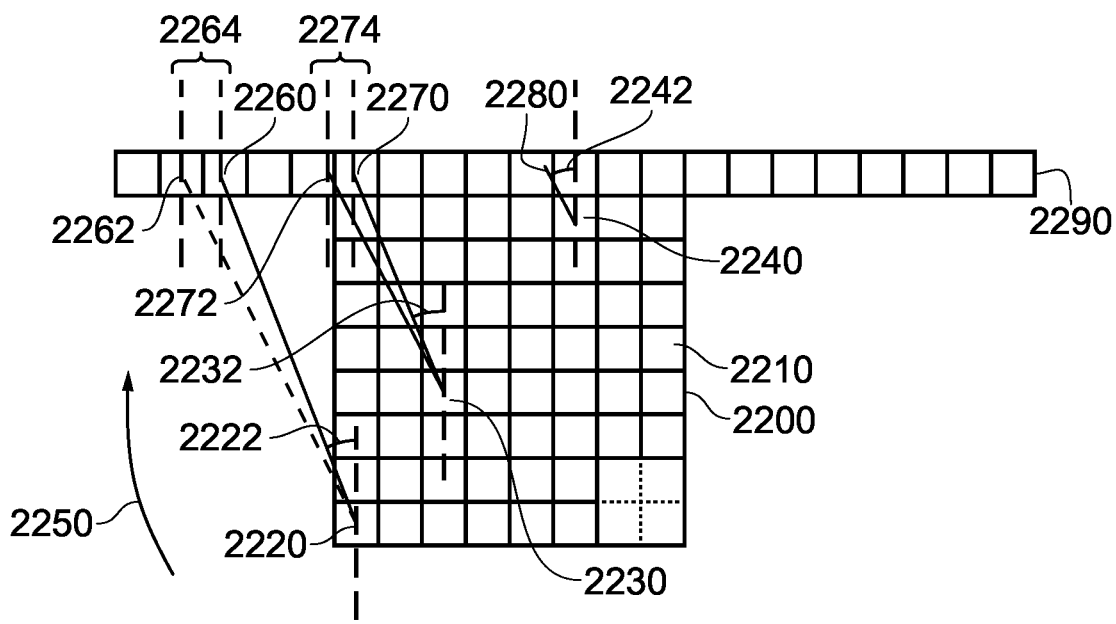

FIG. 22 shows a similar arrangement for a block 2200 of samples 2210 to be predicted and a set 2290 of reference samples, but using a so-called curved prediction mode shown schematically by a direction 2250. Once again, the situation applying to three example sample positions of samples 2210 to be predicted, namely sample positions 2220, 2230, 2240, is described. These positions 2220 . . . 2240 are mapped by the prediction process to reference positions 2260, 2270, 2280 amongst the reference samples 2290. However, the angles 2222, 2232, 2242 between the locations 2220 . . . 2240 and the mapped reference positions 2260 . . . 2280 vary according to the location of the respective sample to be predicted within the block 2200. In the present example, the angles 2222 . . . 2242 become more acute (that is to say smaller with respects to an arbitrary vertical direction) with increasing separation (in the y direction in this example) from the projected set of reference samples 2290. This variation in angle can also be represented by a change in separation 2264, 2274, between a notional location and 2262, 2272 which would be pointed to by a direction at the angle 2242 applicable to the sample 2240, and the actual reference position 2260, 2270. This difference in location in the x direction increases with y separation from the reference samples to the position of the sample to be predicted.

In general for a curved mode, each sample to be predicted is associated with a coordinate position within the current region 2200, and an array or reference position is detected within the set or array of reference samples 2290 as a function of the coordinate position of a given sample to be predicted, with the function depending upon the selected prediction mode. For a curved mode, the function of the coordinate position of that sample to be predicted is a non-linear function.

Examples of suitable non-linear functions for use to define curved prediction modes are as follows:
position=r*tan(angle)
position=(r*r/5)*tan(angle)
where r=row number for vertical modes, for an example block size of 16×16 (the factor of 5 could change for other block sizes)

An analytical function of this nature is not a requirement; instead, a look-up table linking the location of the sample to predicted (or groups or classifications of locations) to reference position could be used. In examples, a different look-up table could be employed for each block size.

Therefore, in these examples, each sample to be predicted is associated with a coordinate position within the current region; and the detector (of the intra predictor 530) is configured to detect the array position for a given sample to be predicted as a function of the coordinate position of the given sample to be predicted, the function depending upon the selected prediction mode. For example, for a curved mode, the function of the coordinate position of that sample to be predicted is a non-linear function. In examples, the non-linear function may be dependent upon a location of the current region within the current image, for example to correspond to a type of distortion known or detected to be present in the image, and similarly the set of prediction modes may be dependent upon a location of the current region within the current image, again for example to correspond to a type of distortion known or detected to be present in the image.

Figure 23:
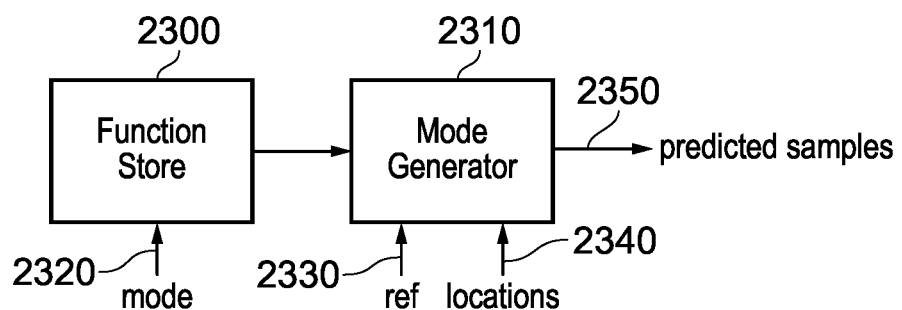
FIG. 23 schematically illustrates a part of an intra predictor.

FIG. 23 schematically illustrates an arrangement forming part of the intra-prediction circuitry (for example, the intra predictor 530 and/or the intra mode selector 520) to allow a generalised set of straight and/or curved prediction modes to be used. A function store 2300 stores functions, whether linear or non-linear, associating locations of samples to be predicted with corresponding reference positions, and a mode generator 2310 applies the currently selected function according to a prediction mode designation or number 2320 to reference samples 2330 and locations 2340 of samples to be predicted in order to generate predicted sample values 2350.

Figure 24:
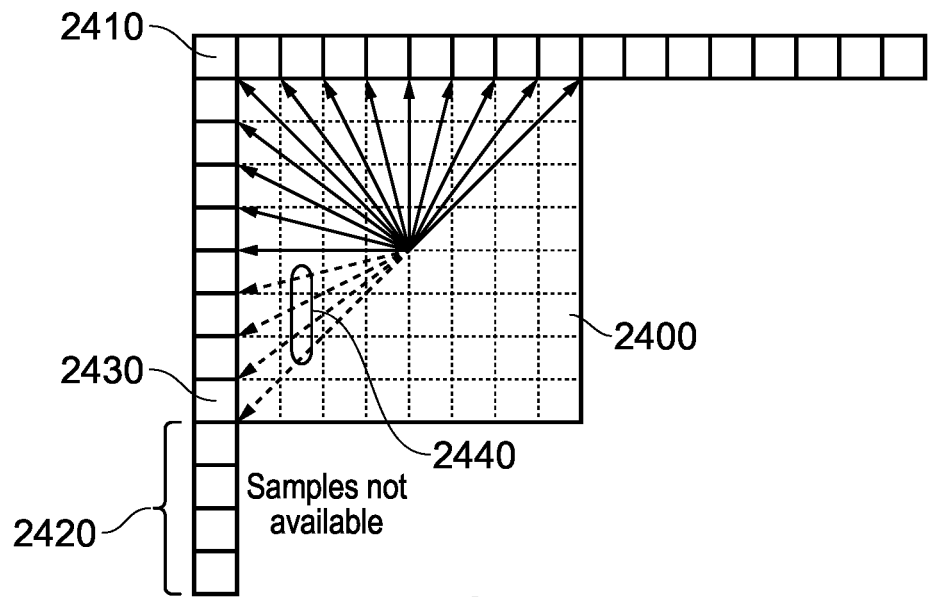
FIGS. 24 and 25 schematically illustrate subsets of prediction modes.
Figure 25:
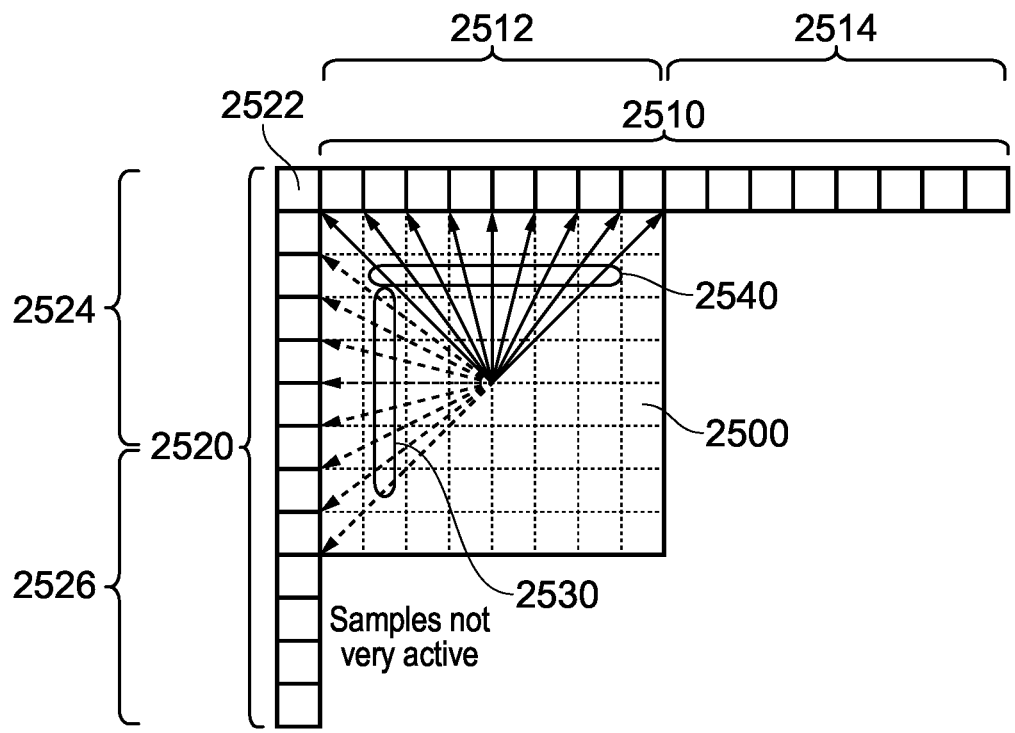

FIGS. 24 and 25 schematically illustrate possible situations which can arise in encoding or decoding a real image. Here, a set of prediction modes available for selection by the intra-mode selector 520 is shown, noting that the set is a smaller set than that shown in FIGS. 10-12, primarily for clarity of the diagram.

Referring to FIG. 24, a block or region 2400 of samples to be predicted have associated reference samples 2410. However, because of the particular block encoding order applicable to the image in question, it may be the case that some reference samples such as a group of samples 2420 are not available for use in predicting samples of the current block or region 2400.

Some video encoding or decoding systems provide a so-called reference sample substitution process in which the samples 2420 are replaced (when unavailable) by, for example, repetitions of a nearest available reference sample such as a sample 2430. However, in techniques to be discussed below, the set of prediction modes from which a mode applicable to the current region 2400 can be selected is varied to account for the non-availability of the samples 2420. For example, a set of prediction modes 2440 may be considered to be less useful in the situation that the samples 2420 are unavailable, since the information obtained by predicting according to one of the prediction modes 2440 may be very limited, for example being based purely upon the sample value of the reference samples 2440 for a large number of samples to be predicted in the block 2400.

In FIG. 25, properties of the reference samples themselves are taken into account, for example the so-called image activity of the reference samples. Image activity is a term referring to the amount of information carried by a set of samples. If the samples are generally different from one another, representing a relatively large amount of localised image detail, then these samples are said to have a large image activity. If a set of samples are similar to one another, or identical, so that they represent a lack of localised image detail, those samples are said to have a low image activity. An example measure of image activity which can be applied analytically to a set of samples is given by the following formula:

for samples 0 to m (being an arbitrary group of m+1 samples, of a group such as the groups 2510, 2520, 2512, 2514, 2524, 2526 or the like), where p is a sample value such as a luminance value:

Let $\text{delta}_m = p_{m-1} - p_m$ $$\text{Activity} = \frac{\sqrt{\sum_{i=1}^{i=m} \text{delta}_m^2}}{m}$$

It is appreciated that, to reduce complexity of the calculation, the sum of the squares is often replaced with a sum of the absolute values, and the square root operation can also be removed.

In the example situation shown in FIG. 25, reference samples 2510 with respect to a block or region 2500 of samples to be predicted have a higher image activity (shown schematically in FIG. 25) by the variation in shading drawn for those reference samples. Reference samples 2520 have a generally lower image activity, shown schematically in FIG. 25 by identical shading applied to the representation applied to those reference samples in the drawing. This implies that for a set of prediction modes 2530 pointing towards the reference samples having the lower image activity, potentially less useful information providing a variation of predicted sample values across the block 2500 will be obtained than if one of a set 2540 of prediction modes is used.

Example embodiments to be discussed below make use of a controller (for example, embodied by the intra mode selector and/or as discussed with reference to FIGS. 29 to 33 discussed below) to select (from a set of prediction directions such as a full set as shown in FIGS. 10-12) a set of candidate prediction directions as a subset of the (full) set of prediction directions, for a current image region of a current image, in dependence upon current properties of a group of reference samples of the current image applicable to the current image region. For example, the one or more properties can represent at least image activity of the group of reference samples, and the selection of the subset of prediction directions can be weighted towards reference samples in the group of reference samples having higher image activity.

Example arrangements will now be discussed with reference to FIGS. 26-28, in which, purely for the purposes of the present discussion, a situation will be assumed in which the set of candidate prediction directions is at least weighted towards generally vertical prediction directions, for example because of a detection of greater image activity amongst reference samples (such as the reference samples 2510 in FIG. 25) above the current region 2500, compared to image activity of reference samples 2520 to the left of the current region.

Figure 26:
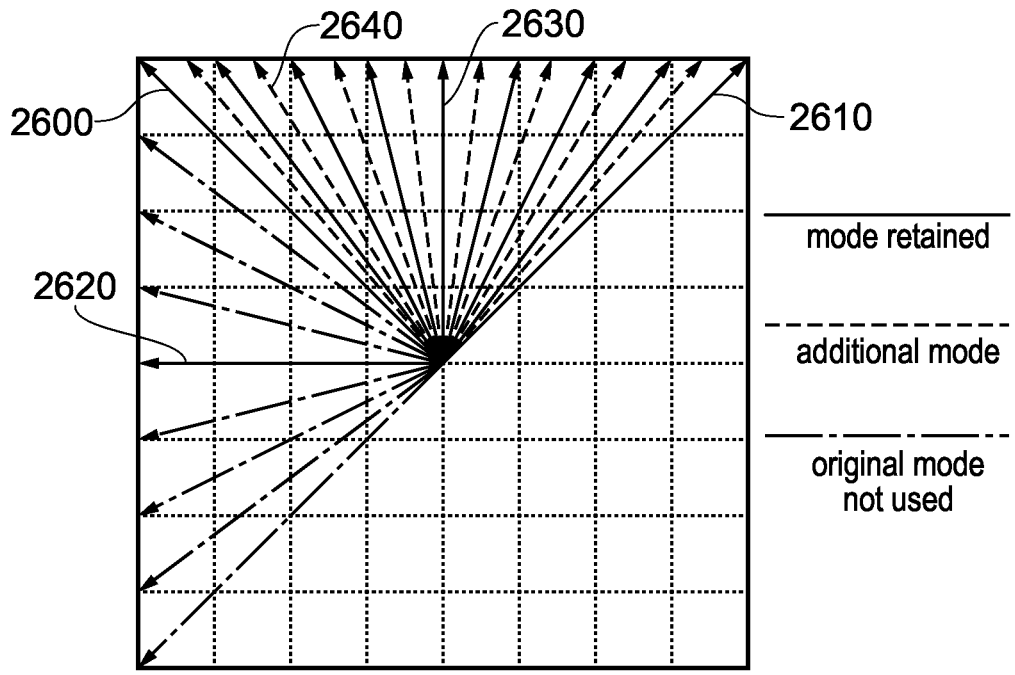
FIGS. 26 to 28 schematically illustrate candidate sets of prediction modes.

In FIG. 26, three types of lines are used to schematically represent different prediction modes, referring to the full set of prediction modes of FIG. 24 (which is in turn a generally smaller number than that shown in FIGS. 10-12 purely for clarity of the diagram). These different representations are shown to the right of FIG. 26, in which a solid line indicates a prediction mode of the original full set which is retained under the present process; a dotted line indicates an additional mode (to be discussed below) and a line formed of alternate dashes and dots (-.-.) represents a mode of the original set which is not used (or made available to be used) in the selection of a prediction mode for the current block of samples to be predicted.

In terms of the modes of the original set retained under the current process, in the present example of reference samples 2510 above the current block 2500 having a higher activity, those modes from the upper left diagonal mode 2600 (mode 18 in the representation of FIG. 11, or an equivalent number in the representation of FIG. 12) around to the diagonal right mode 2610 (mode 34 in the representation of FIG. 11 or an equivalent in the representation of FIG. 12) are retained. In some examples, modes having a greater horizontal component than the mode 2600 are not used as candidate modes for the current block.

However, an optional exception to this arrangement is to retain a horizontal mode 2620 (mode number 10 in the representation of FIG. 11, or an equivalent number in the representation of FIG. 12). This is because the horizontal mode (and, in other example situations in which vertical modes are excluded from the candidate set a vertical mode 2630) can be used in part to signal a scan order, which is to say an order of processing of one or both of: samples to be predicted within a block; and blocks or sub-blocks of samples to be predicted. As such, it can be useful to retain the horizontal 2620 and vertical 2630 modes as candidate modes which can be selected in respect of a current block to be predicted, even if one of them would not otherwise be retained by virtue of the criteria relating to the properties of the group of reference samples. Therefore, in examples, the set of candidate prediction directions may include at least a horizontal prediction direction and a vertical prediction direction. More generally, since it is common for the entropy decoding process to be separate from the reconstruction of the image (i.e. the transform and prediction processes), in cases where the entropy decoder uses the signalled intra prediction mode to adjust the entropy coding process, the intra prediction mode is used as signalled, and not as would later be remapped by the consideration of reference samples.

The process described so far leads to the generation or selection of a set of candidate prediction directions as a subset of the (full) set of prediction directions, for use in respect of a current image region. This technique in itself can potentially lead to more efficient coding because fewer mode numbers need to be encoded and so, potentially, fewer bits can be used to encode the mode numbers.

However, in other example arrangements, so-called additional modes are also used.

Examples of additional modes (such as an additional mode 2640 in FIG. 26) include: (i) a prediction direction lying between a respective pair of prediction directions in the set of candidate prediction directions; and/or (ii) a prediction direction having or representing an angle between a sample position of a sample to be predicted and a corresponding reference position which varies with a location, within the current block or region, of the sample to be predicted. In other words, using the terminology employed above, the first category relates to additional straight prediction modes and the second category relates to additional curved prediction modes.

FIG. 26 shows an example in which additional straight prediction modes are provided, and FIG. 28 to be discussed below relates to additional curved prediction modes. A combination of the two can also be used.

So, in FIG. 26, amongst the original prediction modes from the original (full) set between the mode 2600 and the mode 2610, additional modes are interspersed, for example evenly between pairs of adjacent original modes.

Figure 27:
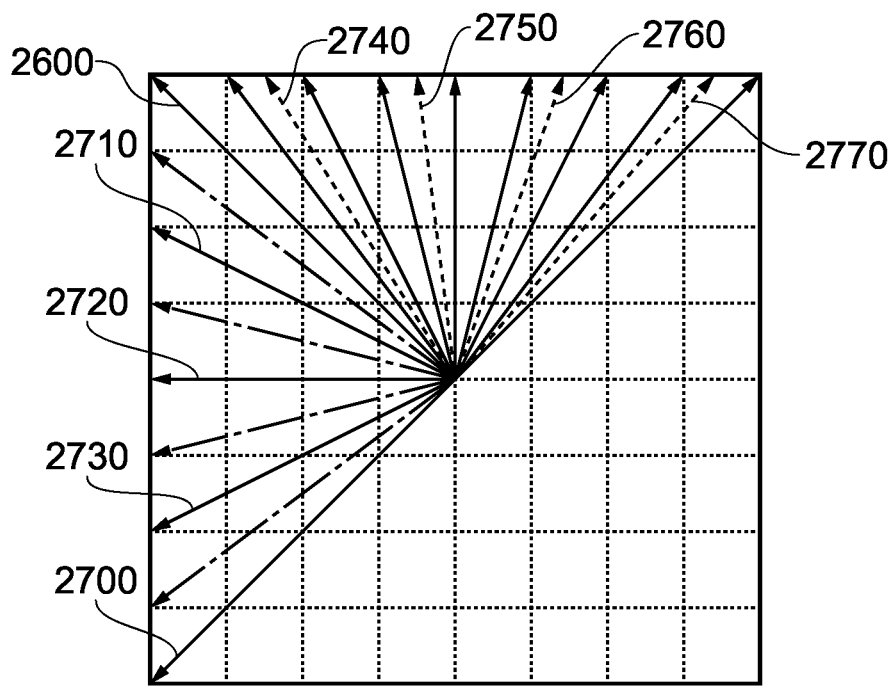

In FIG. 27, which uses the same notation as FIG. 26 and refers to the same example situation of higher activity in the upper reference samples, a subset of original modes between the mode 2600 and a lower diagonal mode 2700 such as the mode 2 in FIG. 11 or an equivalent number in the notation of FIG. 12 are retained. For example, alternate original modes 2710, 2720 (which may be retained any as the horizontal mode), 2730 are retained and intervening original modes are not used in the candidate set. In the schematic example shown, this means that there are four original modes not used, so that without exceeding the original mode numbering, four additional modes 2740, 2750, 2760, 2770 can be introduced.

This arrangement can be implemented by using a mapping between the original mode numbers for these modes not retained in the candidate subset and the additional modes, for example as shown in the following table, which uses an example notation based upon the numbering of FIG. 11, although it will be appreciated that a similar arrangement could be employed with different numbering such as a numbering appropriate to FIG. 12. This example relates to an example situation in which horizontal modes other than mode 10 are reduced by removing alternate modes, in a generally similar manner to that shown in FIG. 27:

| Original mode number | Outcome | Replacement |
| --- | --- | --- |
| 2 | retained | |
| 3 | removed from candidate set | assign to additional mode between 19 & 20 |
| 4 | retained | |
| 5 | removed from candidate set | assign to additional mode between 21 & 22 |
| 6 | retained | |
| 7 | removed from candidate set | assign to additional mode between 23 & 24 |
| 8 | retained | |
| 9 | removed from candidate set | assign to additional mode between 25 & 26 |
| 10 | retained | |
| 11 | removed from candidate set | assign to additional mode between 26 & 27 |
| 12 | retained | |
| 13 | removed from candidate set | assign to additional mode between 28 & 29 |
| 14 | retained | |
| 15 | removed from candidate set | assign to additional mode between 30 & 31 |
| 16 | retained | |
| 17 | removed from candidate set | assign to additional mode between 32 & 33 |
| 18-34 | retained | |

Figure 28:
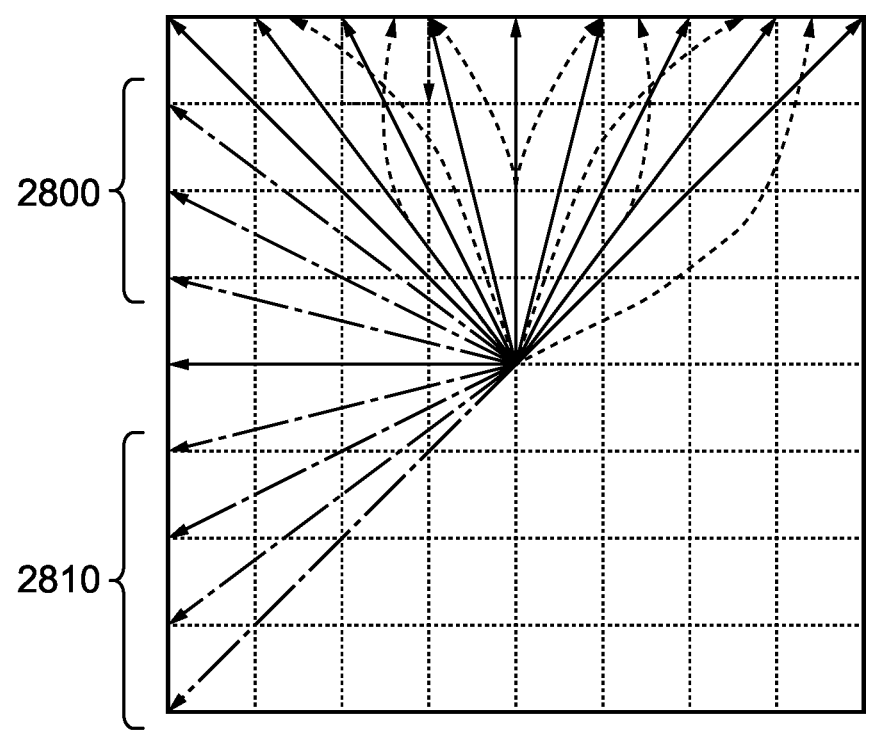

FIG. 28 provides another example which refers to the same example situation as that shown in FIG. 26 and uses the same notation for the retained, additional and not used modes. Here, the modes 2800, 2810 are not used as candidate prediction modes, which allows seven additional modes to be introduced without exceeding the original mode numbering. In the example of FIG. 28, the seven additional modes are so-called curved (or non-linear, or non-straight) modes as discussed above.

So, the subsets of candidate modes derived in the examples of FIGS. 26-28 can be used in respect of a current block, on the basis of properties of the reference samples applicable to the current block.

As shown in FIG. 28, the one or more additional prediction directions may comprise one or more of: (i) a prediction direction lying between a respective pair of prediction directions in the set of candidate prediction directions; and (ii) a prediction direction having an angle, between a current sample to be predicted and a reference position amongst the reference samples, which varies with a location, within the current region, of the current sample to be predicted. There may be one or more additional directions between a respective pair of prediction directions. The additional prediction direction(s) may or may not be equidistant from their respective pair.

Figure 29:
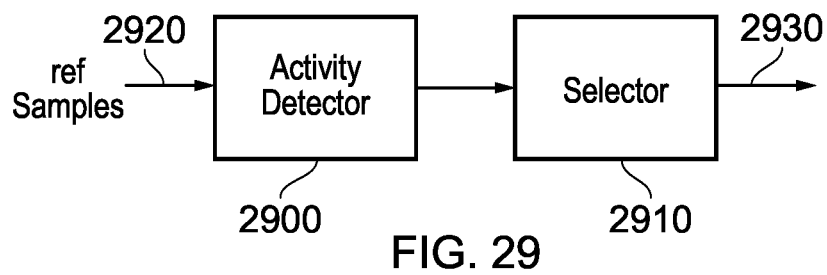
FIGS. 29 and 30 schematically illustrate operations of a controller.

FIG. 29 schematically illustrates an example of a controller to select, from a set of prediction directions, a set of candidate prediction directions as a subset of the set of prediction directions, for a current image region of a current image, in dependence upon one or more properties of a group of reference samples of the current image applicable to the current image region.

In particular, in the example of FIG. 29, an activity detector 2900 is responsive to the reference samples 2920 applicable to the current region and provides activity data to a selector 2910 which generates a set of candidate prediction modes 2930. As discussed above this could (for example) be a simple subset of the original full set of prediction modes as discussed in connection with FIG. 26. The activity detector 2900 could operate with respect to, for example, a first group of reference samples such as the group 2510 of FIG. 25 above the current region 2500 and a second group of reference samples to the left of the current region 2500 (with a corner reference sample 2522 being arbitrarily assigned to either or indeed both of those groups). In other examples, sub-groups of reference samples could be considered, such as a pair of sub-groups 2512, 2514 in place of the group 2510 (or indeed in addition to it) and a pair of sub-groups 2524, 2526 in addition to or instead of the subgroup 2520.

In embodiments where multiple groups of reference samples are available, the groups could be examined to select the available mode. For example, if there were multiple rows of reference samples available, the rows could be correlated to steer the availability of modes. For curved modes, the multiple lines of reference samples could be used to steer the curvature at the edge, and the intra prediction mode be used to steer the average angle for the block. For most straight modes, one row could be projected onto the other for the specified intra prediction mode and at sub-fractional offsets to that prediction mode, with the sub-fractional (or zero) offset selected depending on how the two rows correlate. For the latter case, since there is often a tendency for the transform/quantisation process to steer the residual to the orthogonal direction, the sub-fractional offsets may be better to be biased towards a particular side of the default mode, rather than evenly about it The reference samples with the higher (or highest) activity could lead to only prediction directions pointing in that or those directions being made available in the candidate modes. In other examples, a subset (such as alternate) prediction modes could be excluded in the "lower activity" direction and optionally additional modes could be inserted in the "higher activity" direction. This arrangement provides an example in which the one or more properties represent at least image activity of the group of reference samples; and the selection of the subset of the prediction directions is weighted towards reference samples in the group of reference samples having higher image activity. More generally, the one or more properties can represent at least one from the list consisting of: image activity of the group of reference samples, the selection of the subset of the prediction directions being weighted towards reference samples in the group of reference samples having higher image activity; and position of the current image region within a picture. For example, if there would be a need to extrapolate or repeat reference samples because the set of reference samples in use extend beyond a current decoded region and/or have not been buffered, then the set of candidate modes can be predominantly including those pointing to reference samples which are not extrapolated or repeated. the position within a picture or image portion such as a slice can have a similar effect on availability of reference samples, so that (for example) some of the reference sample positions may fall outside the current picture or image portion by virtue of the position of the block, so that once again the set of candidate modes is steered towards reference samples which actually exist. In some example, modes which point to reference samples outside the current coding tree unit are removed from the set of modes available for use.

Figure 30:
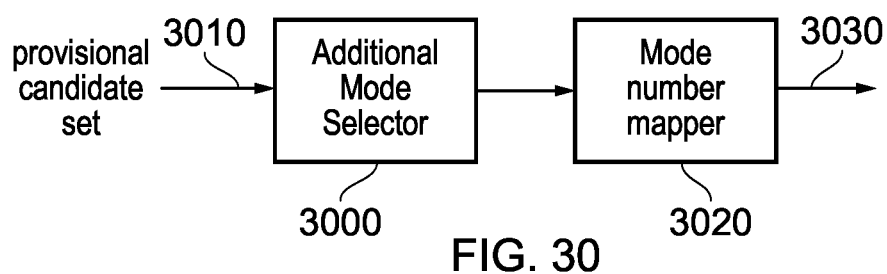

As mentioned above, the operation of the selector could simply be to choose a subset of the original full set of modes as the candidate set of prediction directions. However, in other examples, the selector could include functionalities as shown in FIG. 30 in which an additional mode selector 3000, responsive to a provisional candidate set of modes 3010 selected as a subset of the full set, adds additional modes to the subset selected as the provisional candidate set, and a mode number mapper 3020 applies a mapping between the additional modes and original but unused mode numbers using the techniques discussed above to generate a candidate set 3030 of prediction modes applicable to the current image region. This provides an example in which the controller is configured to supplement the set of candidate prediction directions with one or more additional prediction directions not forming part of the set of prediction directions. The mapping process provides an example in which the set of prediction directions each have associated direction identifiers; and the controller is configured to assign the one or more additional prediction directions to respective direction identifiers associated with prediction directions which are in the set of prediction directions but not in the subset of prediction directions.

Figure 31:
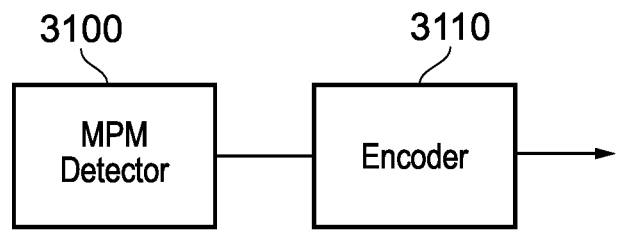
FIG. 31 schematically illustrate the use of most probable modes.

FIG. 31 relates to a process which can be carried out in addition to the techniques discussed above, using a most probable mode (MPM) detector 3100 and an encoder 3110.

In some example arrangements, so-called most probable modes are derived from the modes applicable to previously encoded/decoded blocks. The aim of this process is that (a) the derivation of MPMs can be carried out in an identical manner at the encoder during encoding, and at the decoder during decoding, so that both are dealing with the same MPMs for any particular sample, (b) if the image content is similar between the current block and the previously encoded blocks from which the MPMs were derived, there is at least a good chance that samples of the current block will also use an MPM, and (c) a MPM can be encoded with a potentially smaller amount of data in the bit-stream, compared with an arbitrary one of the full set of MPMs. Therefore, for a sample of a current block, a shorter amount of data can be used to encode the chosen mode if it is an MPM derived from one or more previously (for example, preceding) encoded blocks. This is because a short data code can be used to indicate simply that "this sample is using the most probable mode derived by the pre-configured process from the previous blocks" rather than having to specify one mode amongst a group of, for example, 67 modes. So, given that mode selection is often similar within image regions, this can provide an overall saving in bit-rate.

The term "most probable mode" is one used in the art, and is therefore employed here for convenience. "More commonly used mode" would be another possible term for use in connection with these modes. The term MPM does not imply an absolute highest probability that a mode derived from preceding samples will be the most likely to be selected for a particular sample. However, so-called MPMs tend to be modes which are commonly used for preceding samples, or are derived from modes which are commonly used for preceding samples, and so there is generally a higher likelihood that they will be applicable to a current sample.

It is also noted that more than one MPM can be derived. The term "MPM" does not imply that the (more than one) modes are equally most likely, but as a set of two or more MPMs, they are intended to have an increased likelihood of being applicable to the current sample.

In the present examples, the controller is configured to detect, as further candidate prediction directions, one or more likely prediction directions in response to those commonly used for one or more previously encoded image regions and to encode the data identifying the prediction direction as either: (i) data indicating that the prediction direction is a detected likely prediction direction, or (ii) data identifying the prediction direction amongst the remaining candidate prediction directions.

Figure 32:
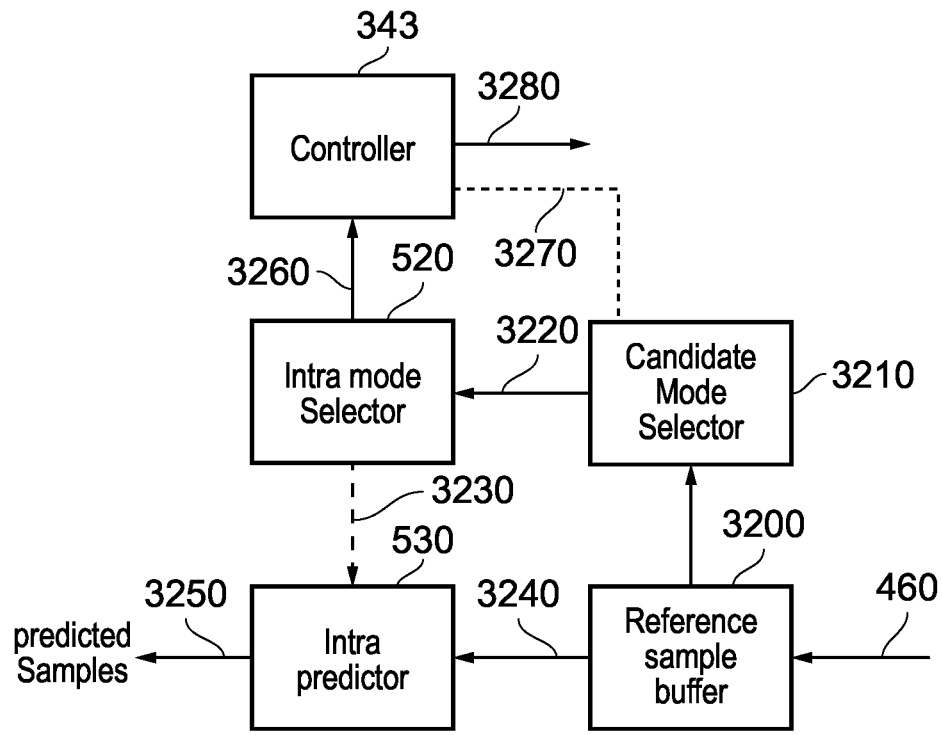
FIG. 32 schematically illustrate encoding circuitry.

FIG. 32 schematically illustrates the manner by which the techniques discussed above can fit into the arrangements described with reference to FIGS. 1 . . . 8 above. Particular reference is made to FIG. 8. A reference sample buffer 3200 is used to store reference samples received as the sample 460 from the adder 450. Using the buffered reference samples, a candidate mode selector 3210—operating in accordance with FIG. 29 and optionally FIG. 30 as well—selects a set 3220 of candidate prediction modes being a subset of the original (full) set of prediction modes, possibly with some additional modes. These are provided to the intra mode selector 520 which selects a prediction mode for use in respect of the current block of samples to be predicted and provides this as a selected prediction mode to the intra predictor 530. The intra predictor 530 uses the selected prediction mode 3230 according to the reference samples 3240 in the reference sample buffer to generate predicted samples 3250.

The intra mode selector 520 also provides information relating to the selected mode (as information 3260 to the controller 343). The controller 343 can also receive information 3270 from the candidate mode selector 3210 defining the selection of candidate modes and/or any mapping between additional modes and non-used original modes. The controller 343 encodes information 3280 for inclusion in the encoded data, to represent the mode selector by the intra selector and/or any mapping performed by the candidate mode selector.

FIG. 32 therefore provides an example of an image encoding apparatus comprising:
- a controller (343, 2900, 2910, 3000, 3020) configured to select, from a set of prediction directions, a set of candidate prediction directions as a subset of the set of prediction directions, for a current image region of a current image in dependence upon one or more properties of a group of reference samples of the current image applicable to the current image region; and
- an intra-image predictor (530) configured to predict samples of the current image region with respect to one or more of the group of reference samples of the same image according to a prediction direction between the current sample and a reference position amongst the reference samples;
- in which the intra-image predictor is configured to select the prediction direction for the current image region from the set of candidate prediction directions.

For example, the controller may be configured to encode data identifying the prediction direction selected for each sample or region of the image.

Figure 33:
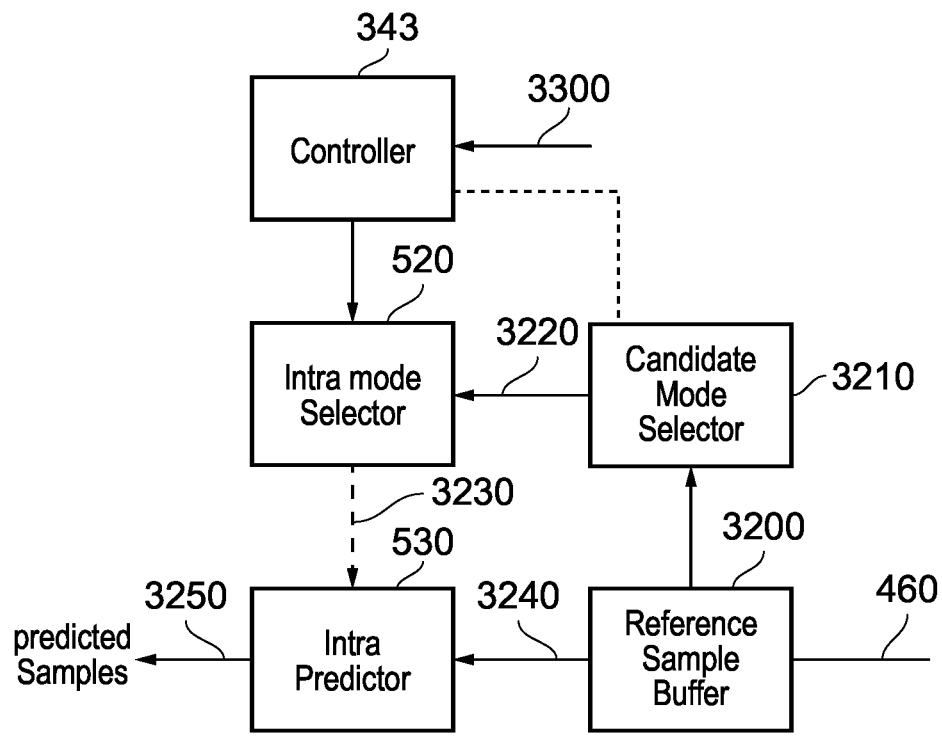
FIG. 33 schematically illustrates decoding circuitry.

FIG. 33 shows a similar arrangement in the context of a decoding apparatus, in which the controller 343 is responsive to encoded information defining one or both of: a prediction mode, and a candidate set of prediction modes. The controller passes this information to the intra mode selector 520 and the candidate mode selector. The intra mode selector 4520 then selects an appropriate mode from the candidate set made available by the candidate mode selector. Other aspects of operation of the apparatus are similar to those described above with reference to FIG. 32.

FIG. 33 therefore provides an example of an image decoding apparatus comprising:
- a controller (343, 2900, 2910, 3000, 3020) configured to select, from a set of prediction directions, a set of candidate prediction directions as a subset of the set of prediction directions, for a current image region of a current image in dependence upon one or more properties of a group of reference samples of the current image applicable to the current image region; and
- an intra-image predictor (530) configured to predict samples of the current image region with respect to one or more of the group of reference samples of the same image according to a prediction direction between the current sample and a reference position amongst the reference samples;
- in which the intra-image predictor is configured to select the prediction direction for the current image region from the set of candidate prediction directions.

For example, the controller may be configured to detect encoded data identifying the prediction direction selected for each sample or region of the image.

Figure 34:
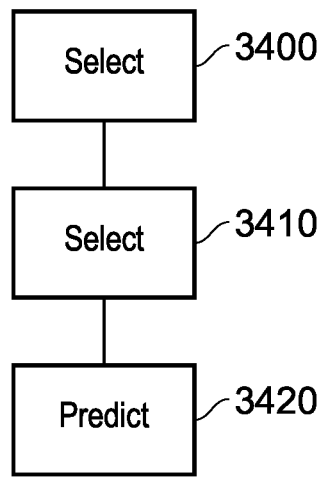
FIGS. 34 to 37 are schematic flowcharts illustrating respective methods.

FIG. 34 is a schematic flowchart illustrating an image encoding method comprising:
- selecting (at a step 3400), from a set of prediction directions, a set of candidate prediction directions as a subset of the set of prediction directions, for a current image region of a current image in dependence upon one or more properties of a group of reference samples of the current image applicable to the current image region;
- selecting (at a step 3410) a prediction direction for the current image region from the set of candidate prediction directions; and
- intra-image predicting (at a step 3420) samples of the current image region with respect to one or more of the group of reference samples of the same image according to a prediction direction between the current sample and a reference position amongst the reference samples.

Figure 35:
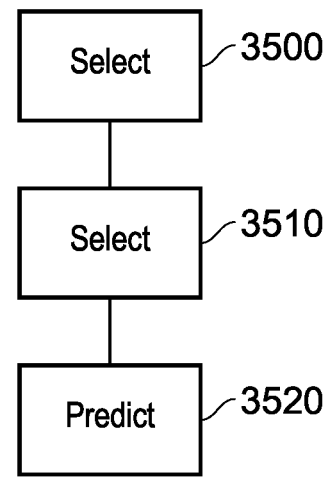

FIG. 35 is a schematic flowchart illustrating an image decoding method comprising:
- selecting (at a step 3500), from a set of prediction directions, a set of candidate prediction directions as a subset of the set of prediction directions, for a current image region of a current image in dependence upon one or more properties of a group of reference samples of the current image applicable to the current image region;
- selecting (at a step 3510) a prediction direction for the current image region from the set of candidate prediction directions; and
- intra-image predicting (at a step 3520) samples of the current image region with respect to one or more of the group of reference samples of the same image according to a prediction direction between the current sample and a reference position amongst the reference samples.

Figure 36:
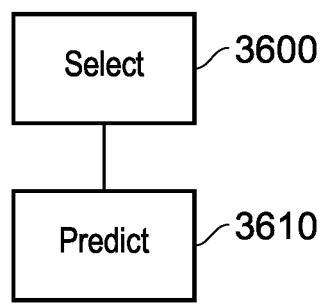

FIG. 36 is a schematic flowchart illustrating an image encoding method comprising:
- selecting (at a step 3600), from a set of prediction modes, a prediction mode for prediction of a current region of a current image; and
- intra-image predicting (at a step 3610) samples of the current region with respect to one or more of the group of reference samples of the same image according to a prediction direction, defined by the selected prediction mode, between a current sample to be predicted and a reference position amongst the reference samples;
- in which the set of prediction modes comprises at least one curved prediction mode defining a prediction direction having an angle between the current sample and the reference position which varies with a location, within the current region, of the current sample to be predicted.

The apparatus of FIGS. 1-8 and 23, operating in accordance with this method, provides an example of an image encoding apparatus comprising:
- a controller configured to select, from a set of prediction modes, a prediction mode for prediction of a current region of a current image; and
- an intra-image predictor configured to predict samples of the current region with respect to one or more of the group of reference samples of the same image according to a prediction direction, defined by the selected prediction mode, between a current sample to be predicted and a reference position amongst the reference samples;

in which the set of prediction modes comprises at least one curved prediction mode defining a prediction direction having an angle between the current sample and the reference position which varies with a location, within the current region, of the current sample to be predicted.

Figure 37:
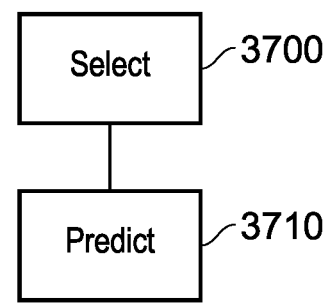

FIG. 37 is a schematic flowchart illustrating an image decoding method comprising:

selecting (at a step 3700), from a set of prediction modes, a prediction mode for prediction of a current region of a current image; and intra-image predicting (at a step 3710) samples of the current region with respect to one or more of the group of reference samples of the same image according to a prediction direction, defined by the selected prediction mode, between a current sample to be predicted and a reference position amongst the reference samples;

in which the set of prediction modes comprises at least one curved prediction mode defining a prediction direction having an angle between the current sample and the reference position which varies with a location, within the current region, of the current sample to be predicted.

The apparatus of FIGS. 1-8 and 23, operating in accordance with this method, provides an example of an image decoding apparatus comprising:

a controller configured to select, from a set of prediction modes, a prediction mode for prediction of a current region of a current image; and an intra-image predictor configured to predict samples of the current region with respect to one or more of the group of reference samples of the same image according to a prediction direction, defined by the selected prediction mode, between a current sample to be predicted and a reference position amongst the reference samples;

in which the set of prediction modes comprises at least one curved prediction mode defining a prediction direction having an angle between the current sample and the reference position which varies with a location, within the current region, of the current sample to be predicted.

Figure 38:
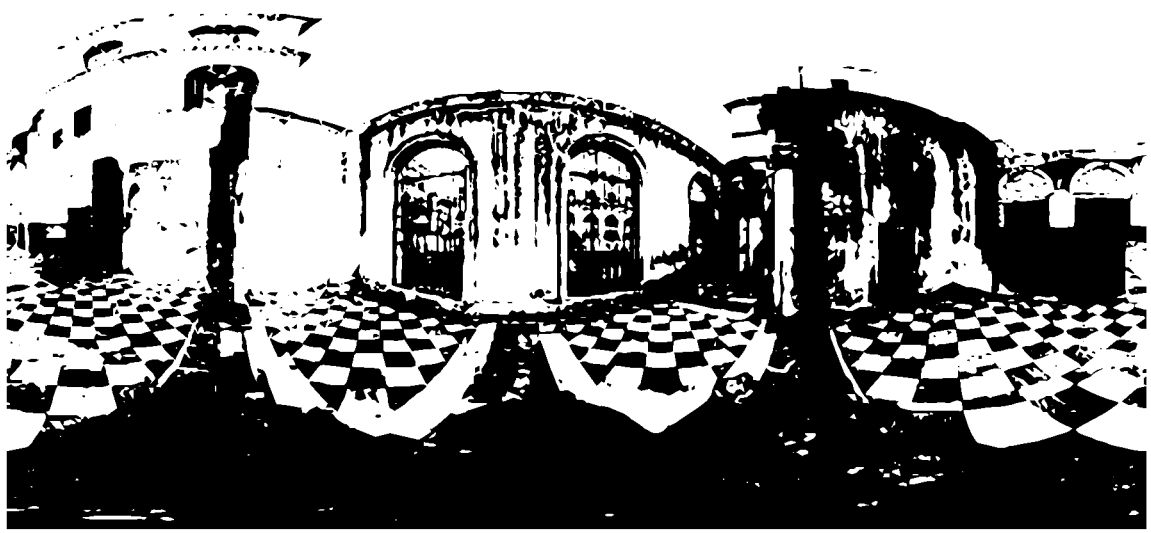
FIG. 38 illustrates an example distorted image.
Figure 39A:
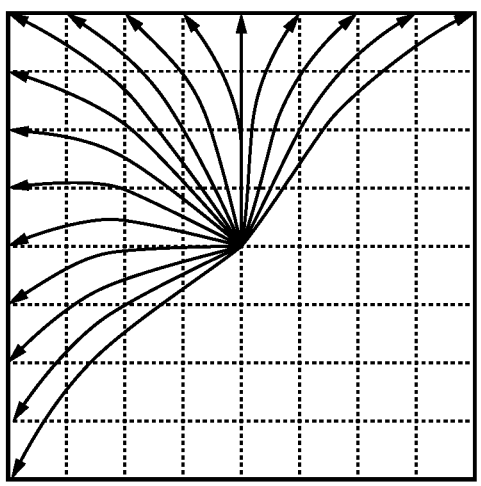
FIGS. 39a and 39b schematically illustrate sets of prediction modes.
Figure 39B:
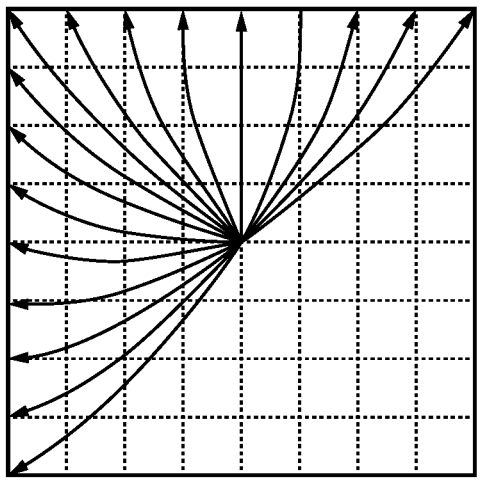

FIG. 38 schematically represents an example distorted image, such as a so-called equirectangular projected (ERP) image. This has known or detectable curvature distortions which can be appropriately suited by a set of curved modes of FIG. 39*a* for use with an upper section of the image and a set of curved modes of FIG. 39*b* for use with a lower section of the image. For example, the non-linear function (indicating the amount of curvature) could vary according to distance of a current region from the horizontal centreline of the image so as to increase the curvature towards the upper and lower peripheries of the image.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective aspects and features are defined by the following numbered clauses:

1. An image encoding apparatus comprising:
    a controller configured to select, from a set of prediction directions, a set of candidate prediction directions as a subset of the set of prediction directions, for a current image region of a current image in dependence upon one or more properties of a group of reference samples of the current image applicable to the current image region; and
    an intra-image predictor configured to predict samples of the current image region with respect to one or more of the group of reference samples of the same image according to a prediction direction between the current sample and a reference position amongst the reference samples;
    in which the intra-image predictor is configured to select the prediction direction for the current image region from the set of candidate prediction directions.

2. Apparatus according to clause 1, in which the one or more properties represent at least one from the list consisting of:
    i. image activity of the group of reference samples, the selection of the subset of the prediction directions being weighted towards reference samples in the group of reference samples having higher image activity;
    ii. position of the current image region within a picture; and
    iii. availability of reference samples for prediction of the current image region.

3. Apparatus according to clause 1 or clause 2, in which the controller is configured to supplement the set of candidate prediction directions with one or more additional prediction directions not forming part of the set of prediction directions.

4. Apparatus according to clause 3, in which:
    the set of prediction directions each have associated direction identifiers; and
    the controller is configured to assign the one or more additional prediction directions to respective direction identifiers associated with prediction directions which are in the set of prediction directions but not in the subset of prediction directions.

5. Apparatus according to clause 3 or clause 4, in which the one or more additional prediction directions comprise one or more of:
    (i) a prediction direction lying between a respective pair of prediction directions in the set of candidate prediction directions; and
    (ii) a prediction direction having an angle, between a current sample to be predicted and a reference position amongst the reference samples, which varies with a location, within the current region, of the current sample to be predicted.

6. Apparatus according to any one of the preceding clauses, in which the set of candidate prediction directions includes at least a horizontal prediction direction and a vertical prediction direction.

7. Apparatus according to any one of the preceding clauses, in which the controller is configured to encode data identifying the prediction direction selected for each sample or region of the image.

8. Apparatus according to clause 7, in which the controller is configured to detect, as further candidate prediction directions, one or more likely prediction directions in response to those commonly used for one or more previously encoded image regions and to encode the data identifying the prediction direction as either: (i) data indicating that the prediction direction is a detected likely prediction direction, or (ii) data identifying the prediction direction amongst the remaining candidate prediction directions.

9. Video storage, capture, transmission or reception apparatus comprising apparatus according to any one of the preceding clauses.

10. An image decoding apparatus comprising:
   a controller configured to select, from a set of prediction directions, a set of candidate prediction directions as a subset of the set of prediction directions, for a current image region of a current image in dependence upon one or more properties of a group of reference samples of the current image applicable to the current image region; and
   an intra-image predictor configured to predict samples of the current image region with respect to one or more of the group of reference samples of the same image according to a prediction direction between the current sample and a reference position amongst the reference samples;
   in which the intra-image predictor is configured to select the prediction direction for the current image region from the set of candidate prediction directions.

11. Apparatus according to clause 10, in which the one or more properties represent at least one from the list consisting of:
   i. image activity of the group of reference samples, the selection of the subset of the prediction directions being weighted towards reference samples in the group of reference samples having higher image activity;
   ii. position of the current image region within a picture;
   iii. availability of reference samples for prediction of the current image region.

12. Apparatus according to clause 10 or clause 11, in which the controller is configured to supplement the set of candidate prediction directions with one or more additional prediction directions not forming part of the set of prediction directions.

13. Apparatus according to clause 12, in which:
   the set of prediction directions each have associated direction identifiers; and
   the controller is configured to assign the one or more additional prediction directions to respective direction identifiers associated with prediction directions which are in the set of prediction directions but not in the subset of prediction directions.

14. Apparatus according to clause 12, in which the one or more additional prediction directions comprise one or more of:
   (i) a prediction direction lying between a respective pair of prediction directions in the set of candidate prediction directions; and
   (ii) a prediction direction having an angle, between a current sample to be predicted and a reference position amongst the reference samples, which varies with a location, within the current region, of the current sample to be predicted.

15. Apparatus according to any one of clauses 10 to 14, in which the set of candidate prediction directions includes at least a horizontal prediction direction and a vertical prediction direction.

16. Apparatus according to any one of clauses 10 to 15, in which the controller is configured to detect encoded data identifying the prediction direction selected for each sample or region of the image.

17. Apparatus according to clause 16, in which the controller is configured to detect, as further candidate prediction directions, one or more likely prediction directions in response to those commonly used for one or more previously encoded image regions and to encode the data identifying the prediction direction as either: (i) data indicating that the prediction direction is a detected likely prediction direction, or (ii) data identifying the prediction direction amongst the remaining candidate prediction directions.

18. Video storage, capture, transmission or reception apparatus comprising apparatus according to any one of clauses 10 to 17.

19. An image encoding method comprising:
   selecting, from a set of prediction directions, a set of candidate prediction directions as a subset of the set of prediction directions, for a current image region of a current image in dependence upon one or more properties of a group of reference samples of the current image applicable to the current image region;
   selecting a prediction direction for the current image region from the set of candidate prediction directions; and
   intra-image predicting samples of the current image region with respect to one or more of the group of reference samples of the same image according to a prediction direction between the current sample and a reference position amongst the reference samples.

20. Computer software which, when executed by a computer, causes the computer to carry out a method according to clause 19.

21. A machine-readable non-transitory storage medium which stores software according to clause 20.

22. An image decoding method comprising:
   selecting, from a set of prediction directions, a set of candidate prediction directions as a subset of the set of prediction directions, for a current image region of a current image in dependence upon one or more properties of a group of reference samples of the current image applicable to the current image region;
   selecting a prediction direction for the current image region from the set of candidate prediction directions; and
   intra-image predicting samples of the current image region with respect to one or more of the group of reference samples of the same image according to a prediction direction between the current sample and a reference position amongst the reference samples.

23. Computer software which, when executed by a computer, causes the computer to carry out a method according to clause 22.

24. A machine-readable non-transitory storage medium which stores software according to clause 23.

25. A data signal comprising coded data generated according to the method of clause 19.

26. A video capture apparatus comprising an image sensor and the encoding apparatus of any one of clauses 1-8, decoding apparatus of any one of clauses 10-17 and a display to which the decoded images are output.

The invention claimed is:
1. An intra-prediction decoder comprising:
   circuitry configured to:
   predict image sample values of a current image region of an image with respect to one or more a reference samples in the image using an angular prediction direction selected from a set of prediction directions for reference samples located above and to the left of the image sample to be predicted at corresponding angles between bottom left and top right, and decode based on the prediction, wherein for first prediction directions in the set exceeding a predetermined angle, first prediction directions are not used and are assigned to second prediction directions corresponding to different prediction directions to those in the set such that each of the first prediction directions is applied in the decoding as a different prediction direction from the respective first prediction direction.

2. The intra-prediction decoder as claimed in claim 1, wherein the image sample value is in a non-square rectangular image region.

3. The intra-prediction decoder as claimed in claim 2, wherein the circuitry is configured to assign the first prediction directions to the second prediction only for decoding non-square rectangular image regions.

4. The intra-prediction decoder as claimed in claim 1, wherein the circuitry determines whether to assign the first prediction directions to second prediction directions based on a particular current image region shape to be decoded.

5. The intra-prediction decoder as claimed in claim 4, wherein the circuitry is configured to adapt a mode of operation of the intra-prediction decoder according to the size of the image region for the particular image region shape, the circuitry determining which first prediction directions are not used and are assigned to second prediction directions for the mode of operation.

6. The intra-prediction decoder as claimed in claim 1, wherein the second prediction directions are assigned to additional prediction modes and the number of first prediction directions corresponds to second predictions directions such that the number of prediction modes is the same as a predetermined number of modes for the set of prediction directions.

7. The intra-prediction decoder as claimed in claim 1, wherein the first prediction directions when assigned to the second prediction directions each have an angular relationship to respective ones of the second prediction direction.

8. The intra-prediction decoder as claimed in claim 1, wherein the first prediction directions are directions between bottom left and horizontal left and comprise angles in range of angles less than 45 degrees or are directions between top right and vertical above and comprise angles in range of angles less than 45 degrees.

9. The intra-prediction decoder as claimed in claim 1, wherein the assigned second prediction directions are positioned to be between prediction directions in the set that are used.

10. The intra-prediction decoder as claimed in claim 9, wherein the first directions exclude horizontal or vertical directions.

11. The intra-prediction decoder as claimed in claim 1, wherein the first prediction directions exclude predetermined directions or represent a plurality of ranges of sequential angular prediction modes each range exceeding a predetermined angle.

12. The intra-prediction decoder as claimed in claim 1, wherein the first prediction directions are assigned to second prediction directions each with an angular relationship to a prediction direction selected from the set of prediction directions.

13. The intra-prediction decoder as claimed in claim 1, wherein the second prediction directions comprise at least one direction that points to single reference sample and one direction indicating an interpolated value between surrounding reference samples.

14. The intra-prediction decoder as claimed in claim 1, wherein the set of angular prediction directions correspond to 65 prediction modes respectively numbered from 2 to 66, modes 2 to 33 being horizontal prediction modes, at least some of the horizontal prediction modes being assigned by remapping to prediction directions pointing to reference samples located above a current image block to be decoded.

15. The intra-prediction decoder as claimed in claim 1, wherein the current image region is a horizontally orientated non-square rectangular image region.

16. A video storage, capture, transmission or reception apparatus comprising:

the intra-prediction decoder according to claim 2.

17. An intra-prediction decoding method comprising:

predicting image sample values of a current image region of an image with respect to one or more a reference samples in the image using an angular prediction direction selected from a set of prediction directions for reference samples located above and to the left of the image sample to be predicted at corresponding angles between bottom left and top right; and decoding based on the predicting, wherein for first prediction directions in the set exceeding a predetermined angle, first prediction directions are not used and are assigned by circuitry to second prediction directions corresponding to different prediction directions to those in the set which are between those in the set.

18. The intra-prediction decoding method as claimed in claim 17, wherein the first prediction directions represent a plurality of ranges of sequential angular prediction modes each range exceeding a predetermined angle.

19. The intra-prediction decoding method as claimed in claim 17, wherein the first prediction directions are assigned to second prediction directions each with an angular relationship to a prediction direction selected from the set of prediction directions.

20. A non-transitory storage medium comprising computer code components which when executed on a computer cause the computer to execute the method of claim 17.

* * * * *